United States Patent
Shyamsunder et al.

(10) Patent No.: US 10,185,741 B2
(45) Date of Patent: Jan. 22, 2019

(54) SMART NAVIGATION SERVICES

(71) Applicant: VERISIGN, INC., Reston, VA (US)

(72) Inventors: Karthik Shyamsunder, Winchester, VA (US); Neel Goyal, Rockville, MD (US); Valinder Mangat, Reston, VA (US); Daniel Schonfeld, Reston, VA (US); Burton S. Kaliski, Jr., McLean, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 14/176,723

(22) Filed: Feb. 10, 2014

(65) Prior Publication Data

US 2014/0156702 A1 Jun. 5, 2014

Related U.S. Application Data

(63) Continuation-in-part of application No. 13/250,864, filed on Sep. 30, 2011, and a continuation-in-part of
(Continued)

(51) Int. Cl.
*G06F 17/30* (2006.01)
(52) U.S. Cl.
CPC .. *G06F 17/30424* (2013.01); *G06F 17/30672* (2013.01); *G06F 17/30864* (2013.01); *G06F 17/30873* (2013.01); *G06F 17/30876* (2013.01)

(58) Field of Classification Search
CPC ............... H04L 67/20; G06F 17/30864; G06F 17/30752; G06F 17/3087; G06Q 30/0256; G06Q 30/0613
(Continued)

(56) References Cited

U.S. PATENT DOCUMENTS 6,115,754 A 9/2000 Landgren
6,424,980 B1 7/2002 Iizuka et al.
(Continued)

FOREIGN PATENT DOCUMENTS

CN 1327195 A 12/2001
CN 101753559 A 6/2010
(Continued)

OTHER PUBLICATIONS

T.V. Raman, "Usage Patterns for Client-Side URI Parameters," W3C Working Draft, Apr. 15, 2009, pp. 1-7, http://www.w3.org/TR/2009/WD-hash-in-uri-20090415, accessed Jun. 12, 2012.
(Continued)

*Primary Examiner* — Barbara B Anyan
(74) *Attorney, Agent, or Firm* — MH2 TECHNOLOGY LAW GROUP, LLP

(57) ABSTRACT

Techniques for smart navigation are presented. The techniques can include receiving, at a navigation service and via the internet, a request for a network resource, where the request includes command data provided by a navigation client, and where the command data includes an entity name and a keyword. The techniques can include obtaining, from at least one database of the navigation service, a network locator corresponding to the entity name and the keyword. The techniques can further include providing, in response to the receiving and via the internet, the network locator.

22 Claims, 18 Drawing Sheets

Related U.S. Application Data application No. 13/622,541, filed on Sep. 19, 2012, which is a continuation-in-part of application No. 13/250,864, filed on Sep. 30, 2011.

(60) Provisional application No. 61/452,516, filed on Mar. 14, 2011, provisional application No. 61/809,377, filed on Apr. 7, 2013, provisional application No. 61/811,234, filed on Apr. 12, 2013, provisional application No. 61/820,391, filed on May 7, 2013.

(58) Field of Classification Search
USPC .................................. 709/203, 217, 219
See application file for complete search history.

(56) References Cited

U.S. PATENT DOCUMENTS

| | | | |
|---|---|---|---|
| 6,625,644 | B1 | 9/2003 | Zaras |
| 6,654,741 | B1 | 11/2003 | Cohen et al. |
| 6,901,436 | B1 | 3/2005 | Schneider |
| 6,957,224 | B1 | 10/2005 | Megiddo et al. |
| 7,130,877 | B2 * | 10/2006 | McNeely ............. H04L 67/02 709/201 |
| 7,315,902 | B2 | 1/2008 | Kirkland |
| 7,634,532 | B2 * | 12/2009 | Kawamura ....... G06F 17/30752 709/203 |
| 7,894,986 | B2 * | 2/2011 | Hegedus ............. G01C 21/343 340/988 |
| 7,908,317 | B2 | 3/2011 | Musson |
| 7,921,097 | B1 | 4/2011 | Dandekar et al. |
| 8,001,013 | B2 * | 8/2011 | Serbanescu ........ G06Q 30/0601 705/26.4 |
| 8,060,601 | B1 | 11/2011 | Brown et al. |
| 8,073,850 | B1 | 12/2011 | Hubbard et al. |
| 8,082,491 | B1 * | 12/2011 | Abdelaziz ............. G06F 9/465 709/201 |
| 8,224,994 | B1 | 7/2012 | Schneider |
| 8,381,276 | B2 | 2/2013 | Costinsky |
| 8,463,877 | B1 | 6/2013 | Richardson et al. |
| 8,510,348 | B2 | 8/2013 | Hancock |
| 8,630,200 | B2 | 1/2014 | St. Jean et al. |
| 8,756,341 | B1 * | 6/2014 | Richardson ......... H04L 67/2814 370/351 |
| 2002/0010709 | A1 * | 1/2002 | Culbert ............. G06F 17/30876 715/234 |
| 2002/0046257 | A1 | 4/2002 | Killmer |
| 2002/0193986 | A1 * | 12/2002 | Schirris .............. G06F 17/2872 704/8 |
| 2003/0208472 | A1 * | 11/2003 | Pham .................. G06F 17/30876 |
| 2004/0039798 | A1 | 2/2004 | Hotz et al. |
| 2005/0060291 | A1 | 3/2005 | Kirkland et al. |
| 2005/0071834 | A1 | 3/2005 | Gates et al. |
| 2006/0101005 | A1 * | 5/2006 | Yang ................... G06F 17/3087 |
| 2007/0094727 | A1 * | 4/2007 | Singh ................... H04L 63/126 726/22 |
| 2007/0100795 | A1 * | 5/2007 | Davies ............... G06F 17/30864 |
| 2007/0130109 | A1 | 6/2007 | King et al. |
| 2007/0150342 | A1 | 6/2007 | Law et al. |
| 2007/0180147 | A1 | 8/2007 | Leigh |
| 2007/0250468 | A1 | 10/2007 | Pieper |
| 2007/0255731 | A1 * | 11/2007 | Maze ................ G06F 17/30011 |
| 2007/0273518 | A1 * | 11/2007 | Lupoli ................... G06Q 10/08 340/572.1 |
| 2008/0005194 | A1 | 1/2008 | Smolen et al. |
| 2008/0086555 | A1 | 4/2008 | Feinleib |
| 2008/0201413 | A1 * | 8/2008 | Sullivan ............ H04L 29/12066 709/203 |
| 2008/0228719 | A1 * | 9/2008 | Abhyanker ....... G06F 17/30528 |
| 2008/0228720 | A1 * | 9/2008 | Mukherjee ....... G06F 17/30672 |
| 2008/0281816 | A1 | 11/2008 | Kim |
| 2008/0306913 | A1 | 12/2008 | Newman et al. |
| 2009/0228557 | A1 | 9/2009 | Ganz et al. |
| 2009/0254425 | A1 | 10/2009 | Horowitz et al. |
| 2009/0254427 | A1 * | 10/2009 | Garrison ........... G06F 17/30873 705/14.55 |
| 2010/0031369 | A1 | 2/2010 | Grummt |
| 2010/0036797 | A1 * | 2/2010 | Wong .................. G06F 17/3087 706/55 |
| 2010/0077323 | A1 | 3/2010 | Hunter |
| 2010/0097634 | A1 * | 4/2010 | Meyers .............. H04N 1/00214 358/1.15 |
| 2010/0198837 | A1 * | 8/2010 | Wu .................. G06F 17/30672 707/748 |
| 2010/0287191 | A1 * | 11/2010 | Price ................. G06F 17/30864 707/769 |
| 2010/0325101 | A1 * | 12/2010 | Beal ....................... G06Q 30/02 707/707 |
| 2011/0055314 | A1 | 3/2011 | Rosenstein et al. |
| 2011/0078553 | A1 | 3/2011 | Reimann et al. |
| 2011/0113112 | A1 | 5/2011 | Ganz et al. |
| 2011/0119243 | A1 * | 5/2011 | Diamond .......... G06F 17/30867 707/706 |
| 2011/0137789 | A1 | 6/2011 | Kortina et al. |
| 2011/0179154 | A1 | 7/2011 | Ravichandran et al. |
| 2011/0238584 | A1 * | 9/2011 | Ikavalko ........... G06F 17/30737 705/310 |
| 2011/0258204 | A1 | 10/2011 | Hubbard et al. |
| 2011/0307432 | A1 * | 12/2011 | Yao .................. G06F 17/30864 706/25 |
| 2012/0079368 | A1 | 3/2012 | Abdelaziz et al. |
| 2012/0173565 | A1 * | 7/2012 | Jacobs .............. G06F 17/30873 707/769 |
| 2012/0173692 | A1 | 7/2012 | Lakes et al. |
| 2012/0204224 | A1 | 8/2012 | Wang et al. |
| 2012/0239731 | A1 | 9/2012 | Shyamsunder et al. |
| 2012/0278467 | A1 | 11/2012 | Schneider |
| 2012/0323912 | A1 | 12/2012 | Stephens, Jr. |
| 2013/0018944 | A1 | 1/2013 | Shyamsunder et al. |
| 2013/0067115 | A1 | 3/2013 | Lapanc |
| 2014/0040312 | A1 | 2/2014 | Gorman et al. |
| 2014/0136572 | A1 | 5/2014 | Miller et al. |
| 2014/0143337 | A1 | 5/2014 | McIntosh et al. |
| 2014/0181256 | A1 | 6/2014 | Trifa et al. |
| 2014/0245193 | A1 * | 8/2014 | Brindley ........... G06F 17/30038 715/760 |
| 2015/0296230 | A1 * | 10/2015 | Barton ................. G06F 1/3203 725/32 |

FOREIGN PATENT DOCUMENTS

| | | |
|---|---|---|
| CN | 101840413 A | 9/2010 |
| CN | 102246171 A | 11/2011 |
| JP | 11328079 * | 11/1999 |
| WO | 9803932 A1 | 1/1998 |
| WO | 2005001628 A2 | 1/2005 |
| WO | 2005/031613 A1 | 4/2005 |
| WO | 2010/002603 A1 | 1/2010 |
| WO | 2010/068376 A2 | 6/2010 |
| WO | 2012/151752 A1 | 11/2012 |

OTHER PUBLICATIONS

International Search Report and Written Opinion dated Sep. 17, 2013, issued in International Application No. PCT/US2012/028848, filed Mar. 13, 2012, 9 pages.
Non-Final Office Action dated Oct. 22, 2013, issued in U.S. Appl. No. 13/250,864, filed Sep. 30, 2011, 15 pages.
Extended European Search Report dated Feb. 12, 2014 issued in European Application No. 13182268.6 filed Aug. 29, 2013, 5 pages.
Non-Final Office Action dated Jun. 2, 2014, U.S. Appl. No. 13/622,541, filed Sep. 19, 2012, pp. 1-36.
Non-Final Office Action dated Jan. 23, 2015, U.S. Appl. No. 13/622,541, filed Sep. 19, 2012, pp. 1-26.
Non-Final Office Action dated Feb. 13, 2015, U.S. Appl. No. 13/250,864, filed Sep. 30, 2011, pp. 1-17.
Non-Final Office Action dated Sep. 14, 2015, U.S. Appl. No. 14/611,707, pp. 1-19.
Final Office Action dated Aug. 12, 2015, U.S. Appl. No. 13/622,541, pp. 1-28.

(56) References Cited

OTHER PUBLICATIONS

Demetris Antoniades et al., "we.b: The web of short URLs", Proceedings of the 20th International Conference on World Wide Web. ACM, Mar. 28-Apr. 1, 2011, pp. 715-724.

International Search Report and Written Opinion of the International Searching Authority dated Nov. 30, 2015, International Application No. PCT/US2015/046705, pp. 1-9.

Extended European Search Report dated Dec. 22, 2015, European Application No. 15182432.3, pp. 1-6.

Non-Final Office Action dated Apr. 20, 2017, U.S. Appl. No. 14/834,198, pp. 1-46.

Second Office Action dated Jan. 16, 2017, Chinese Patent Application No. 201280014226.6, pp. 1-7.

Non-Final Office Action dated Jan. 26, 2017, U.S. Appl. No. 14/611,707, pp. 1-18.

Mike Thelwall et al., "Custom Interfaces for Advanced Queries in Search Engines", 2001, ASLIB Proceedings, 53(10), pp. 413-422.

XDI Organization, History—XDI.ORG, Retrieved from the Internet Sep. 6, 2017: http://xdi.org/?page_id=13, pp. 1-3.

Bill H. Washburn, "OASIS Extensible Resource Identifier (XRI) TC", Retrieved from the Internet Sep. 6, 2017: https://www.oasis-open.org/committees/xri/ipr.php, pp. 1-3.

United States Court of Appeals, Federal Circuit, *Cordance Corporation* v. *Amazon Com Inc*, Retrieved from the Internet on Sep. 6, 2017: http://caselaw.findlaw.com/us-federal-circuit/1581016.html, pp. 1-7.

Mark Little, "XRI versus URI?", May 22, 2005, Retrieved from the Internet Sep. 6, 2017: https://www.infoq.com/news/2008/05/xsiurl, pp. 1-8.

First Office Action dated Sep. 19, 2017, Chinese Application No. 201310388767.1, pp. 1-11 (including English Translation).

PTO Non-Final Office Action dated Feb. 5, 2018, U.S. Appl. No. 15/697,171, pp. 1-33.

PTO Final Office Action dated Jan. 24, 2018, U.S. Appl. No. 14/611,707, pp. 1-23.

Extended European Search Report dated Aug. 5, 2016, European Application No. 14783257.0, pp. 1-8.

Anonymous, "Semantic URL—Wikipedia, the free encyclopedia", Jan. 29, 2015, Retrieved from the internet on Jun. 2, 2016: http://web.archive.org/web/20150129082609/http://en.wikipedia.org/wiki/Semantic_URL, pp. 1-3.

Anonymous, "URL redirection—Wikipedia, the free encyclopedia", Jan. 17, 2015, Retrieved from the internet on Jun. 2, 2016: http://web.archive.org/web/20150117115508/http://en.wikipecia.org/wiki/URL_redirection, pp. 1-10.

Extended European Search Report dated Jun. 23, 2016, European Application No. 16153508.0, pp. 1-12.

Final Office Action dated May 6, 2016, U.S. Appl. No. 14/611,707, pp. 1-28.

First Chinese Office Action dated Apr. 1, 2016, Chinese Application No. 201280014226.6, pp. 1-32.

\* cited by examiner

510a: http://www.newnews.com/#earthquake
510b: (part of 510a grouping with #earthquake)
520: www.acmecorp.cc#anvil
530: momandpopshop.com#green light special
540: www.vanderbilt.edu/students/undergraduate/#(admission*|entrance)
550: site.netops.globalsecuritiestrade.org/stocks.pl?lang=fr&mobile=yes#ETFs
560: https://www.electronicsgalore.com/#Mop#Vacuum#Toilet
560a, 560b, 560c

Figure 5

600:
610: GET / HTTP/1.1
Accept: image/gif, image/x-xbitmap, image/jpeg, image/pjpeg, application/x-shockwave-flash, application/xaml+xml, application/vnd.ms-xpsdocument, application/x-xbap, application/x-ms-application, application/vnd.ms-excel, application/vnd.ms-powerpoint, application/msword, */*
Accept-Language: en-us
UA-CPU: x86
Accept-Encoding: gzip, deflate
User-Agent: Mozilla/4.0 (compatible; MSIE 7.0; Windows NT 5.1; .NET CLR 2.0.50727; .NET CLR 3.0.04506.30; .NET CLR 1.1.4322; .NET CLR 3.0.4506.2152; .NET CLR 3.5.30729; NET4.0C; NET4.0E)
Host: www.newnews.com
Connection: Keep-Alive
620

⎧ HTTP/1.1 200 OK
     ⎪ Date: Sun, 13 Mar 2011 20:52:58 GMT
     ⎪ Server: Apache
     ⎪ Set-Cookie: user_id=06242010
     ⎪ Accept-Ranges: bytes
710 ⎨ Cache-Control: max-age=60, private, private
     ⎪ Expires: Sun, 13 Mar 2011 20:53:54 GMT
     ⎪ Content-Type: text/html
     ⎪ Vary: User-Agent,Accept-Encoding
     ⎪ Content-Length: 24359
     ⎪ Keep-Alive: timeout=2, max=10
     ⎩ Connection: Keep-Alive ⎧ <!DOCTYPE HTML PUBLIC "-//W3C//DTD HTML 4.01 Transitional//
     ⎪ EN""http://www.w3.org/TR/html4/loose.dtd"><html lang="en">
     ⎪ <head>
     ⎪     <title>NewNews.com - All the News That's Fit To Be Tied</title>
     ⎪     <meta http-equiv="refresh" content="1800;url=?refresh=1">
     ⎪  721a⎧ <script src="http://www.resolvecom.com/scripts/keyworddetector.js"
     ⎪      ⎩        type="text/javascript"></script>
     ⎪ 721⎨ <script >
     ⎪      ⎪   keywordRedirect();
     ⎪  721b⎨  function keywordRedirect() {
     ⎪      ⎪       . . .
720 ⎨      ⎩  }
     ⎪     </script>
     ⎪ </head>
     ⎪
     ⎪ <body id="NewNewsMainPage">
     ⎪
     ⎪ <h2>Welcome to NewNews.com</h2>
     ⎪ <p>Your source for the most cutting edge and up to date news</p>
     ⎪ <div id="breaking_news">
     ⎪ <ul>
     ⎪ 722⎨ <li><a href="/world/freedonia/events.rb?article_id=07021974">8.9
     ⎪      Magnitude Earthquake Rocks Freedonia</a>
     ⎪         <li><a href="/local/US_IN_Granger/
     ⎪      events.rb?article_id=02131980">Village Idiot Wins Lottery, Loses Ticket</a>
     ⎪ </ul>
     ⎪ . . .
     ⎪ </body>
     ⎩ </html>
```

Figure 7

800 — http://www.resolvecom.com/resolver.php?URL=newnews.com&keyword=earthquake

810: http://www.resolvecom.com/resolver.php?
820: URL=newnews.com&keyword=earthquake
830: newnews.com&keyword=earthquake
830a: newnews.com
830b: keyword=earthquake

Figure 8

900 — http://www.newnews.com/2011/WORLD/asiapcf/03/13/freedonia.quake/index.html

Figure 9

Brand Management Interface

Welcome Example.Com Owner!

Add Brand — 1510

- [X] Alpha Corp.
- [ ] Beta Corp.
- [ ] Delta Corp.
- [ ] ...
- [ ] Other

1512

Proposed Branded Keyword Mapping

| Accept? Y N | Keyword | Proposed Associate URL |
|---|---|---|
| [X] [ ] | Alpha | http://alpha.com/examplealpha.html |
| [ ] [ ] | Alpha Widgets | http://alphacorp.com/widgets |
| [ ] [ ] | Alpha Merger | http://alphacorp.com/merger.html |

1520

SUBMIT — 1514

Third Party Brand Management Interface

Welcome Alpha Corp!

Authorized Domains
- [X] Example.com
- [ ] NewNews.com
- [ ] Acmecorp.com
- ...

1610

Current Participants
- betacorp.com
- verisign.com
- deltacorp.com

1620

Proposed Branded Keyword Mapping — 1630

| Keyword 1634 | Proposed Associate URL | |
|---|---|---|
| Alpha | http://alpha.com/acmeandalpha.html | SUBMIT 1632 |
| Alpha Widgets | http://alphacorp.com/widgets | SUBMIT |
| Alpha Merger | http://alphacorp.com/merger.html | SUBMIT |

Approved Keywords — 1640

Congratulations! The domain beta.com has approved the following keywords: "Alpha," "Alpha Widgets," and "Alpha and Beta."

Rejected Keywords — 1650

The domain name beta.com has rejected the keyword "AlphaBrands." Please resubmit.

SMART NAVIGATION SERVICES

CROSS REFERENCE TO RELATED APPLICATIONS

This application is a continuation-in-part of, and claims priority to and the benefit of pending U.S. patent application Ser. No. 13/250,864 filed Sep. 30, 2011 and entitled, "Methods and Systems for Providing Content Provider-Specified URL Keyword Navigation", which claims the benefit of U.S. Provisional Application No. 61/452,516 filed Mar. 14, 2011, the disclosures of which are hereby incorporated by reference herein in their entireties. This application is also a continuation-in-part of, and claims priority to and the benefit of pending U.S. patent application Ser. No. 13/622,541 filed Sep. 19, 2012 and entitled, "Methods and Systems for Providing Content Provider-Specified URL Keyword Navigation", which is a continuation-in-part of U.S. patent application Ser. No. 13/250,864 filed Sep. 30, 2011, which claims the benefit of U.S. Provisional Application No. 61/452,516 filed Mar. 14, 2011, the disclosures of which are hereby incorporated by reference herein in their entireties. This application also claims the benefit of U.S. Provisional Patent Application No. 61/809,377 filed Apr. 7, 2013 and entitled, "Desired Resource Navigation", pending U.S. Provisional Patent Application No. 61/811,234 filed Apr. 12, 2013 and entitled, "Desired Resource Navigation", and U.S. Patent Application No. 61/820,391 filed May 7, 2013, and entitled, "Smart Navigation in General Name Spaces", the disclosures of which are hereby incorporated by reference herein in their entireties.

SUMMARY

This invention relates to navigating to a network resource, and, more particularly, in some embodiments, to providing navigation to a network resource without standard Domain Name System ("DNS") resolution processing or standard search processing. Other particular embodiments may utilize standard DNS resolution processing.

According to various embodiments, a computer-implemented method of providing a navigation service is disclosed. The method includes receiving, at a navigation service and via the internet, a request for a network resource, the request comprising command data provided by a navigation client, the command data including an entity name and a keyword. The method also includes obtaining, from at least one database of the navigation service, a network locator corresponding to the entity name and the keyword. The method further includes providing, in response to the receiving and via the internet, the network locator.

Various optional features of the above embodiments include the following. The navigation service may not be a domain name system navigation service, that is, the navigation service may function for a name space other than the domain name space The command data can be derived from a command string that includes a name space identifier abutting the entity name. The name space identifier can be: @, fb, in, or ".". The navigation client can select the navigation service based on the name space identifier. The command data can be derived from a command string that includes a keyword delimiter abutting the keyword. The keyword delimiter can be: #, !, ".", $, or |. The method can include: obtaining an internet protocol address corresponding to the network locator from a database of a domain name system service provider, and providing the internet protocol address. The navigation client can parse the command data and construct the request. The method can further include: receiving, by the navigation service, the network locator, the entity name, and the keyword, and storing the network locator in association with the entity name and the keyword. The method can include receiving, by the navigation service, proof of ownership of the entity name. The method can further include, prior to the receiving: obtaining, at the navigation service and via the internet, a fragment of the request for a network resource, the fragment of the request comprising a fragment of the command data provided by the navigation client, the fragment of the command data including an entity name and a fragment of the keyword, obtaining, from at least one database of the navigation service, a plurality of possible keywords at least partially matching at least the fragment of the keyword identifier, and providing, in response to the obtaining and via the internet, the plurality of possible keywords. The method can further include, prior to the receiving: obtaining, at the navigation service and via the internet, a fragment of the request for a network resource, the fragment of the request comprising a fragment of the command data provided by the navigation client, the fragment of the command data including a fragment of an entity name, obtaining, from at least one database of the navigation service, a plurality of possible entity names corresponding to at least the fragment of the entity name, and providing, in response to the obtaining and via the internet, the plurality of possible entity names. The method can include receiving, at the navigation service and via the internet, a second request for a network resource, the second request comprising second command data provided by a navigation client, the second command data including a second entity name, where the second entity name is not contained in the at least one database as an entity name, where the second entity name appears in a third-party name space corresponding to a third-party service, obtaining, from the third-party service, content corresponding to the second entity name, and providing, in response to the receiving and via the internet, a network locator for a resource including the content. The entity name can be contained in the at least one database as an entity name and the keyword can be not contained in the at least one database in association with the entity name, where the obtaining can include searching the at least one database in association with the entity name for a second keyword that is related to the keyword, and where the network locator can correspond to the entity name and the second keyword. The method can include recording entity names, received in requests for network resources, that are not contained in the at least one database as an entity name, and providing at least one entity name that is not contained in the at least one database as an entity name. The method can further include: receiving, at the navigation service and via the internet, a second request for a network resource, the second request comprising second command data provided by the navigation client, the second command data including a second entity name and a second keyword, mapping the second request to a third entity name and a third keyword, obtaining, from the at least one database of the navigation service, a second network locator corresponding to the third entity name and the third keyword, and providing, in response to the receiving the second request and via the internet, the second network locator. The navigation client can include a web browser. The navigation client can be executing on a mobile device.

According to various embodiments, a navigation service system is disclosed. The system includes one or more server computers operably coupled to the internet and configured to receive, via the internet, a request for a network resource, the request comprising command data provided by a navigation client, the command data including an entity name and a keyword. The method also includes at least one database operably coupled to the one or more servers, the at least one database storing a network locator in association with the entity name and the keyword. The method further includes at least one electronic processor configured to provide the network locator to the navigation client via the internet.

Various optional features of the above embodiments include the following. The navigation service may not be a domain name system navigation service. The command data can be derived form a command string that includes a name space identifier abutting the entity name. The name space identifier can be: @, fb, in, or ".". The command data can be derived from a command string that includes a keyword delimiter abutting the keyword. The keyword delimiter can be: #, !, ".", $, or |. The system can include at least one processor configured to: obtain an internet protocol address corresponding to the network locator from a database of a domain name system service provider, and provide the internet protocol address. The system can include at least one processor configured to: receive, by the navigation service, the network locator, the entity name, and the keyword, and store the network locator in association with the entity name and the keyword. The at least one processor can be further configured to receive proof of ownership of the entity name. The system can include at least one processor configured to: obtain, via the internet, a fragment of the request for the network resource, the fragment of the request comprising a fragment of the command data provided by the navigation client, the fragment of the command data including an entity name and a fragment of the keyword, obtain, from the at least one database, a plurality of possible keywords corresponding to at least the fragment of the keyword identifier, and provide, via the internet, the plurality of possible keywords. The system can include at least one processor configured to: obtain, via the internet, a fragment of the request for a network resource, the fragment of the request comprising a fragment of the command data provided by the navigation client, the fragment of the command data including a fragment of an entity name, obtain, from at least one database, a plurality of possible entity names corresponding to at least the fragment of the entity name, and provide, via the internet, the plurality of possible entity names. The at least one processor can be further configured to receive, via the internet, a second request for a network resource, the second request comprising second command data provided by a navigation client, the second command data including a second entity name, where the second entity name is not contained in the at least one database as an entity name, where the second entity name appears in a third-party name space corresponding to a third-party service, obtain, from the third-party service, content corresponding to the second entity name, and provide, via the internet, a network locator for a resource including the content. The entity name can be contained in the at least one database as an entity name and the keyword can be not contained in the at least one database in association with the entity name, the at least one processor can be further configured to search the at least one database for the keyword in association with the entity name for a second keyword that is related to the keyword, and the network locator can correspond to the entity name and the second keyword. The at least one processor can be further configured to record entity names, received in requests for network resources, that are not contained in the at least one database as entity names, and provide at least one entity name that is not contained in the at least one database as an entity name. The system can include at least one processor configured to: receive, via the internet, a second request for a network resource, the second request comprising second command data provided by the navigation client, the second command data including a second entity name and a second keyword, map the second request to a third entity name and a third keyword, obtain, from the at least one database, a second network locator corresponding to the third entity name and the third keyword, and provide, via the internet, the second network locator. The navigation client can include a web browser.

According to various embodiments, a method, implemented using a computer system, is disclosed. The method includes receiving, by a navigation client, a command string including an entity name and a keyword, deriving a request for a resource from the command string, the request including the entity name and the keyword, providing, to a navigation service and via the internet, the request for the resource, and obtaining, from the navigation service, a network locator corresponding to the entity name and the keyword.

Various optional features of the above embodiments include the following. The navigation service may not be a domain name system navigation service. The command string can include a name space identifier abutting the entity name. The name space identifier can be: @, fb, in, or ".". The method can include selecting the navigation service based on a name space identifier. The command string can include a keyword delimiter abutting the keyword. The keyword delimiter can be: #, !, ".", $, or |. The method can include requesting an internet protocol address associated with the network locator, receiving the internet protocol address associated with the network locator, and navigating to the internet protocol address. The deriving can include parsing the command string and constructing the request. The method can include requesting an internet protocol address corresponding to the network locator from a domain name system service provider, and automatically navigating to the internet protocol address. The method can include receiving a request to display the network locator, and providing the network locator for display. The method can include providing a visual indication upon receiving, at a field in a navigation client, the entity name.

According to various embodiments, a system is disclosed. The system includes at least one electronic processor configured to: receive, by a navigation client, a command string including an entity name and a keyword, derive a request for a resource from the command string, the request including the entity name and the keyword, provide, to a navigation service and via the internet, the request for the resource, and obtain, from the navigation service, a network locator corresponding to the entity name and the keyword.

Various optional features of the above embodiments include the following. The navigation service may not be a domain name system navigation service. The command string can include a name space identifier abutting the entity name. The name space identifier can be: @, fb, in, or ".". The at least one processor can be further configured to select the navigation service based on a name space identifier. The command string can include a keyword delimiter abutting the keyword. The keyword delimiter can be: #, !, ".", $, or |. The at least one processor can be further configured to: request an internet protocol address associated with the network locator, receive the internet protocol address associated with the network locator, and navigate to the internet protocol address. The at least one processor can be further configured to parse the command string and construct the request. The at least one processor can be further configured to: request an internet protocol address corresponding to the network locator from a domain name system service provider, and automatically navigate to the internet protocol address. The at least one processor can be further configured to: receive a request to display the network locator, and provide the network locator for display. The at least one processor can be further configured to provide a visual indication upon receiving, at a field in a navigation client, the entity name.

BRIEF DESCRIPTION OF THE DRAWINGS

The accompanying drawings, which are incorporated into and constitute a part of this specification, illustrate embodiments of the invention and together with the description, serve to explain the principles of the invention. In the figures:

FIG. 5 is a list of exemplary URLs containing URL keywords, consistent with certain disclosed embodiments;

FIG. 6 is an exemplary HTTP request resulting from the entry of a URL containing a URL keyword, consistent with certain disclosed embodiments;

FIG. 7 is an exemplary HTTP response from keyword-enabled web server, consistent with certain disclosed embodiments;

FIG. 8 is an exemplary URL for requesting resolution of a URL keyword, consistent with certain disclosed embodiments;

FIG. 9 is an exemplary URL corresponding to a content provider-specified keyword-webpage mapping, consistent with certain disclosed embodiments;

FIG. 15 is an exemplary interface provided by a keyword resolution server to enable a content provider to manage brand-driven keyword mapping, consistent with certain disclosed embodiments;

FIG. 16 is an exemplary interface provided by a keyword resolution server to enable a third party to participate in brand-driven keyword mapping, consistent with certain disclosed embodiments;

DETAILED DESCRIPTION

This disclosure provides methods, systems, computer-readable media, and articles of manufacturer for direct navigation from an agent to a network resource that is desired by a user. This disclosure further provides methods, systems, computer-readable media, and articles of manufacturer that enable users of the agent to navigate to or connect to a desired network resource without necessarily knowing or having to enter the exact domain name, URI, URL, etc. corresponding to the desired network resource.

Consider first the use-case example of a conventional internet user's behavior when looking for a desired network resource, such as a retail website that sells a product, shoes. In this use-case example, the user desires to purchase shoes from the website of a particular entity specified by the user: a fictional retailer known as Gimbels. To do this, the user typically first types into the navigation bar or omnibar of a browser a string of characters that generally describes what is desired, such as "gimbels shoes" (without quotes) and presses enter. The browser then typically sends this character string to a search engine that returns many results, which are displayed by the browser. In this conventional scenario, the retail brand and domain owner Gimbels has no control over what the search engine displays to the user—in most cases, the search engine will display links to many network resources that are unrelated to Gimbels, such as links to competing retailers, off-point products (e.g., sandals instead of shoes), irrelevant pages of Gimbels' website, or almost anything else that an advertiser may pay the search engine to display. Similarly in this conventional scenario, the user may not get the exact network resource the he specified and desires—a Gimbels webpage that sells shoes—as the search engine will return links to many different webpages unrelated to Gimbels often ahead of the link to the Gimbels webpage.

Various embodiments consistent with the present invention allow an entity, such as a domain owner like Gimbels, to shape, specify, or otherwise guide the navigation results provided in response to general descriptions of desired network resources that can be associated with, related with, or otherwise mapped to one or more network resources controlled or operated by the entity.

I. URL-Based Smart Navigation

Figure 1:
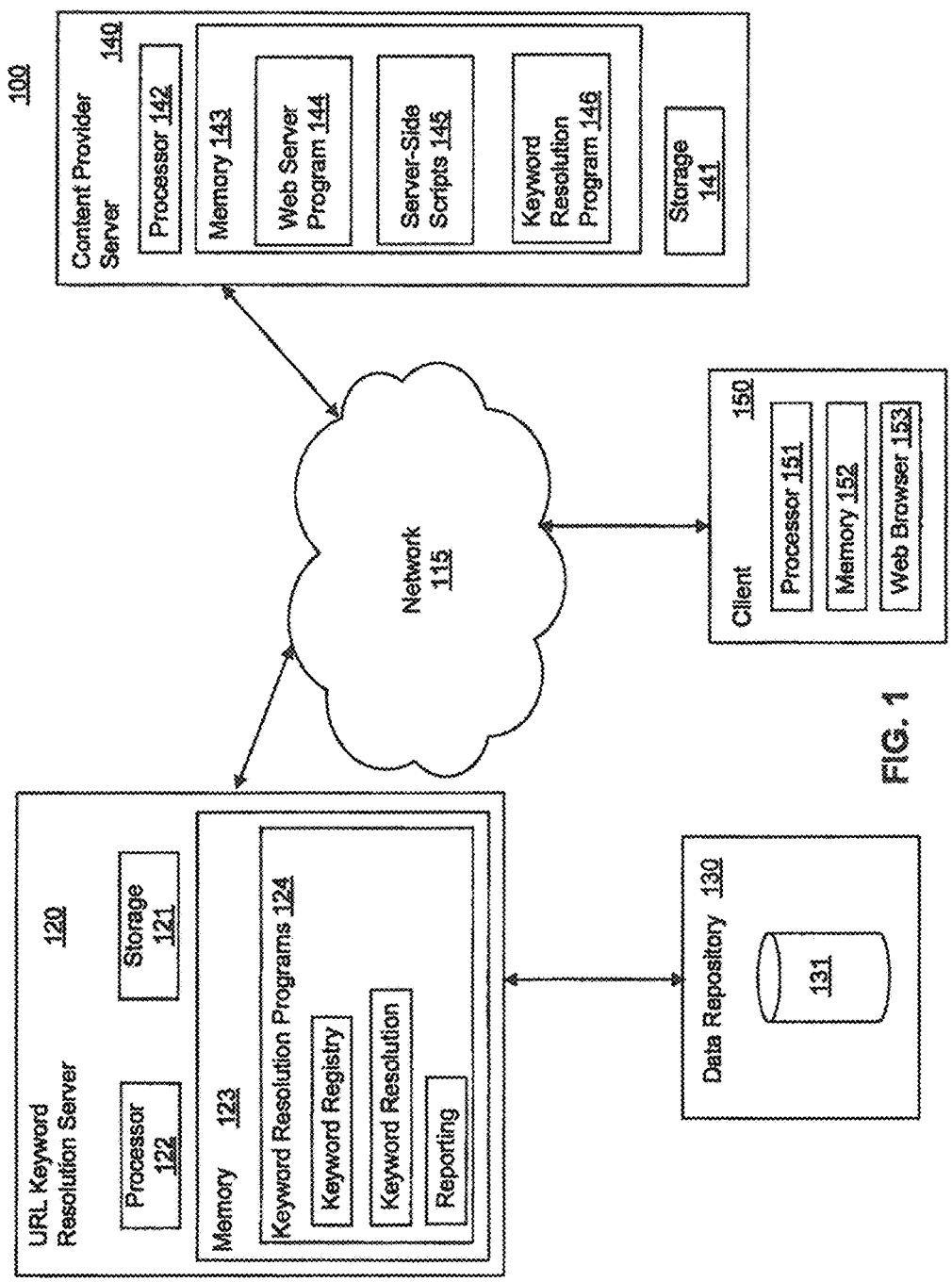
FIG. 1 is a diagram illustrating an exemplary keyword navigation system, consistent with certain disclosed embodiments.

FIG. 1 is a diagram illustrating an exemplary URL keyword resolution system 100 that may be used to implement various disclosed embodiments, including exemplary system components. The components and arrangement, however, may be varied. URL keyword resolution server 120 may include a processor 122, a memory 123, input/ output (I/O) devices (not shown), and storage 121. URL keyword resolution server 120 may be implemented in various ways. For example, URL keyword resolution server 120 may be a general purpose computer, a server, a mainframe computer, or any combination of these components. URL keyword resolution server 120 may communicate over a link with network 115. For example, the link may be a direct communication link, a LAN, a WAN, or other suitable connection. Network 115 may include the internet. URL keyword resolution server 120 may be standalone or it may be part of a subsystem, which may, in turn, be part of a larger system, such as a legacy domain registration system.

Processor 122 may include one or more known processing devices, such as a microprocessor from the Pentium™ or Xeon™ family manufactured by Intel™, the Turion™ family manufactured by AMD™, or any of various processors manufactured by Sun Microsystems. Memory 123 may include one or more storage devices configured to store information used by processor 122 to perform certain functions related to disclosed embodiments. Storage 121 may include a volatile or non-volatile, magnetic, semiconductor, tape, optical, removable, nonremovable, or other type of storage device or computer-readable medium.

In one embodiment, memory 123 may include one or more keyword resolution programs or subprograms 124 loaded from storage 121 or elsewhere that, when executed by URL keyword resolution server 120, perform various procedures, operations, or processes consistent with disclosed embodiments. For example, memory 123 may include a keyword registry program that authenticates a domain name and allows a domain name controller to set up and maintain keywords for the domain name; a keyword resolution program that receives user requests to resolve one or more keywords within a domain, matches the keyword/domain name combination to a target URL, and provides the target URL to the user; a reporting program that displays statistics about keyword usage, resolution requests, and other metrics; an integrative support program that links the other programs and allows them to use a common database, provides a common user interface, performs basic bookkeeping tasks, (such as storing the user's input, etc.), and provides user guidance and help; and a brand management program that allows a domain name controller to enable a third party to provide keywords for the domain. Memory 123 may also include other programs that perform other functions and processes, such as programs that provide communication support, internet access, etc.

Methods, systems, and articles of manufacture consistent with disclosed embodiments are not limited to separate programs or computers configured to perform dedicated tasks. For example, memory 123 may be configured with a keyword resolution program 124 that performs several functions when executed by processor 122. For example, memory 123 may include a single program 124 that performs the functions of the keyword resolution system, or program 124 could comprise multiple programs. Moreover, processor 122 may execute one or more programs located remotely from URL keyword resolution server 120. For example, URL keyword resolution server 120 may access one or more remote programs that, when executed, perform functions related to disclosed embodiments.

Memory 123 may be also be configured with an operating system (not shown) that performs several functions well known in the art when executed by URL keyword resolution server 120. By way of example, the operating system may be Microsoft Windows™, Unix™, Linux™, Solaris™, an Apple Computers operating system, Personal Digital Assistant operating system such as Microsoft CE™, or some other operating system. The choice of operating system, and even the use of an operating system, is not critical to any embodiment.

URL keyword resolution server 120 may include one or more I/O devices (not shown) that allow data to be received and/or transmitted by URL keyword resolution server 120. I/O devices may also include one or more digital and/or analog communication input/output devices that allow URL keyword resolution server 120 to communicate with other machines and devices, such as web server 140 or client computer 150. URL keyword resolution server 120 may receive data from external machines and devices and output data to external machines and devices via I/O devices. The configuration and number of input and/or output devices incorporated in I/O devices may vary as appropriate for certain embodiments.

URL keyword resolution server 120 may also be communicatively connected to one or more data repositories 130, e.g., through network 115. Data repository 130 may include one or more files or databases 131 that store information and are accessed and/or managed through URL keyword resolution server 120. By way of example, the databases may be Oracle™ databases, Sybase™ databases, or other relational databases, or non-relational databases, such as HBase or Cassandra. The databases or other files may include, for example, data and information related to domain names, keywords for domain names, descriptions, statistics, and other data related to keywords, etc. Systems and methods of disclosed embodiments, however, are not limited to separate databases.

URL keyword resolution server 120 may also be communicatively connected to one or more client computers 150 through network 115. Client computer 150 may include a processor 151, a memory 152, and a web browser 153 to communicate with URL keyword resolution server 120 and/or web server 140. Client computer 150 may also be communicatively connected to web server 140 through network 115. In some embodiments, URL keyword resolution server 120 may send data to processor 151 and web browser 153, and web browser 153 may display the data as a keyword registration interface. In some embodiments, a client computer 150 may communicate with web server 140 using the HTTP protocol to retrieve and display webpages provided by web server 140. In some embodiments, a client computer 150 may transmit URL and keyword data to URL keyword resolution server 120 and may receive back target URL data corresponding to a URL designated by a content provider for particular domain/keyword pairs.

Web server 140 may be owned or operated by a content provider or domain name controller and may store web pages and other internet resources associated with one or more domain names. Web server 140 may include a processor 142, a storage 141, and a memory 143. Storage 141 may be a volatile or non-volatile, magnetic, semiconductor, tape, optical, removable, nonremovable, or other type of storage device or computer-readable medium and may contain data used to display individual web pages. In disclosed embodiments, memory 143 may include one or more web server programs for receiving and responding to HTTP requests; one or more server-side scripts 145 for providing dynamic webpages; and one or more keyword resolution programs 146 for receiving and resolving requests for URL/keyword pairs. Each such program, for example, may be loaded from storage 141 or elsewhere.

Figure 2:
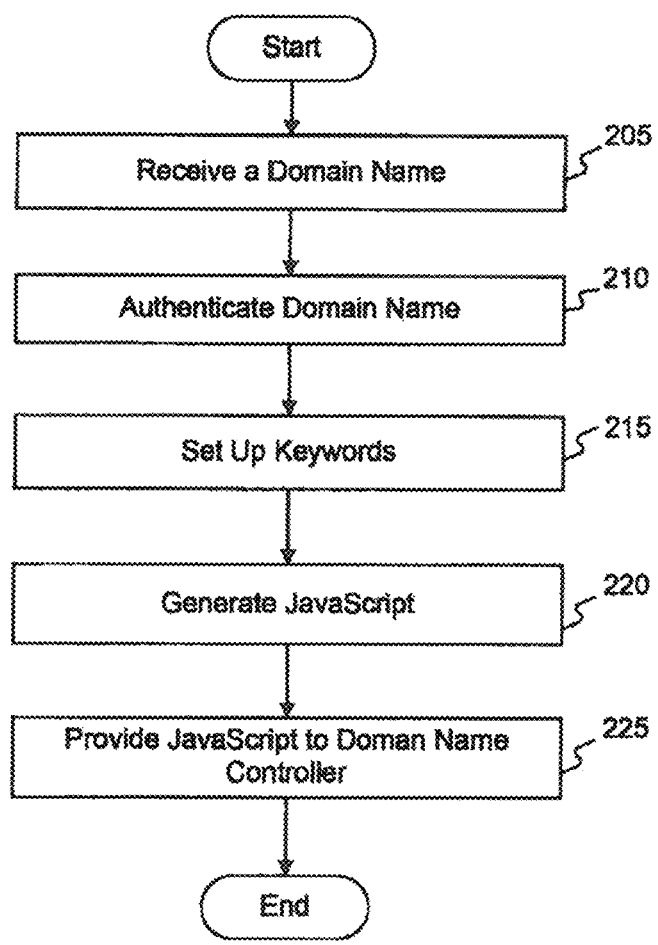
FIG. 2 is a flow diagram illustrating exemplary processes performed by a keyword management server, consistent with certain disclosed embodiments.

FIG. 2 is flow diagram illustrating exemplary processes performed by a keyword management server, consistent with disclosed embodiments. A keyword resolution service provider may provide the majority of technical infrastructure for enabling a content provider to implement URL keyword functionality consistent with the present invention. For example, the keyword resolution service provider may use a keyword management server to provide content providers with an interface, such as the interface depicted in FIG. 3, for registering and managing URL keywords.

In step 205, after a user acting on behalf of a content provider logs into the keyword management interface 300, the keyword management server receives a domain name (which may include path or query string information as well) from the user indicating a domain name for which the user wishes to register a keyword. A domain name identifies a realm of authority or control of internet resources. Domain names are often hostnames that identify websites. For example, acmecorp.cc may be a domain name used by the Acme Corporation. Domain names are often registered through domain name Registrars to signify an exclusive right to use the internet resources associated with the domain names.

In step 210, for security purposes, the keyword management server may first require the user to authenticate the entered domain name by demonstrating that the user has authority to register keywords for it. For example, the keyword management server may create a meta tag for the user to insert into the home page of the domain. Such a meta tag may look like "<meta name="keyword-verification" content="djkaoieiosldisa"/>." The keyword management server may store the domain name and the value of the content field in a database or other file. After the meta tag has been inserted into the home page, the user may return to the authentication process. The keyword management server may then examine the home page of the domain in order to detect the presence of the meta tag. If the meta tag exists and has a content value matching the value stored by the keyword management server, then the user may be verified as having control over the domain name.

In alternate embodiments, a user may be requested to set up a CNAME record in the domain name system (DNS). A DNS record stores information used to resolve internet address requests into a physical resource. A CNAME record specifies that a domain name is an alias of another domain. The keyword management server may, for example, instruct the domain name controller to add a CNAME Host of "djkaoieiosldisa" and a CNAME Text of "www.resolvecom.com" to the DNS. The keyword management server may store the CNAME Host with the domain name in a local database. After the CNAME record has been set up, the user may return to the authentication process. The keyword management server may then query the DNS of the domain to look for the CNAME Host and, if it is found and matches the stored CNAME Host, the user may be verified as the owner of the domain name.

Figure 3:
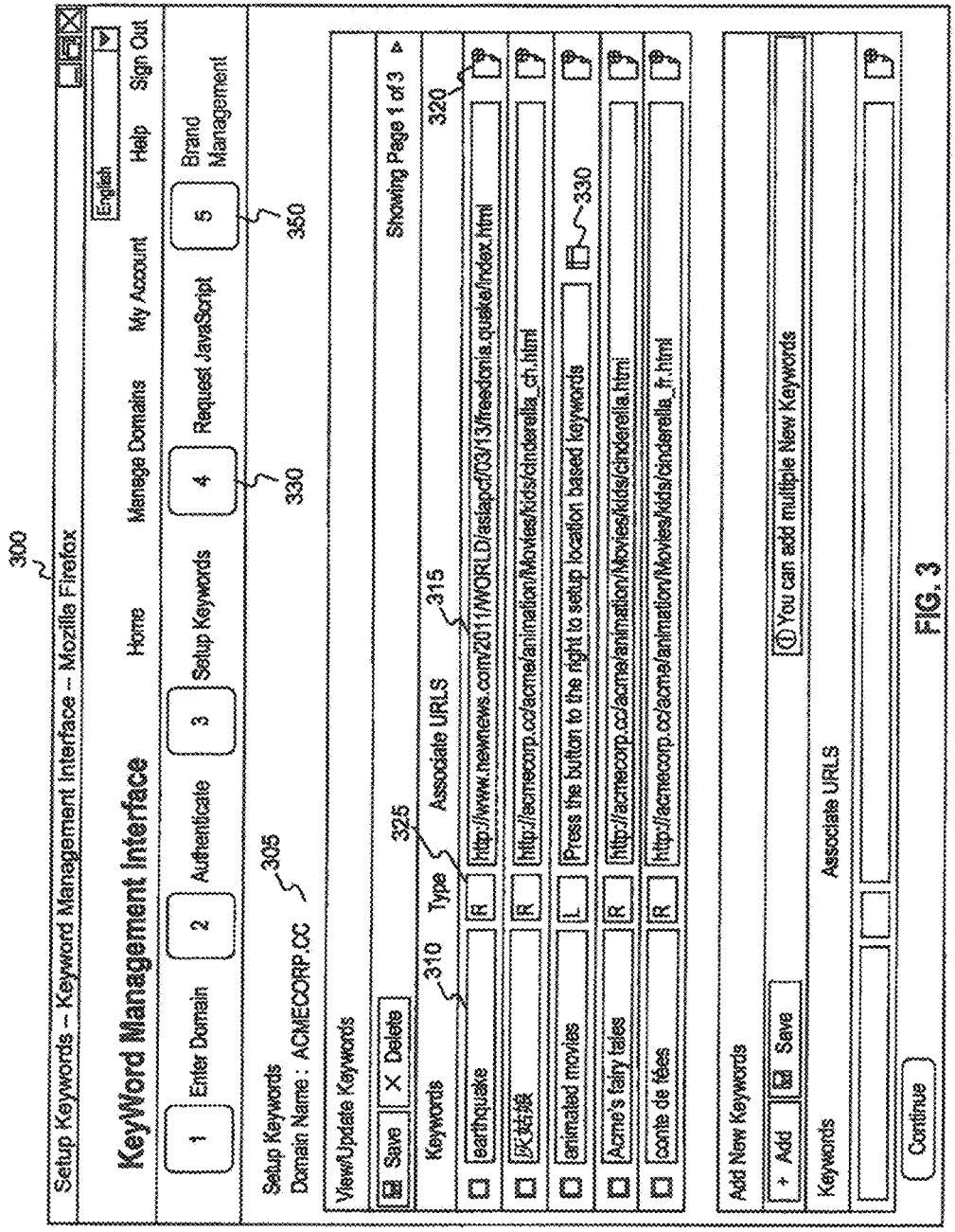
FIG. 3 is an exemplary interface provided by a keyword resolution server to enable a content provider to create, modify, and delete keyword-webpage mappings, consistent with certain disclosed embodiments.

For authenticated domain names, in Step 215, the keyword management server may allow a domain name controller to provide keywords for the domain. The keyword management server may provide an interface, such as the interface shown in FIG. 3, that allows a content provider or domain name controller to set up keywords. Keywords may be associated with a domain name, and the keyword management server may display the current domain name 305 in the interface. As shown in FIG. 3, the keyword management server may receive at least keyword 310 and URL 315 from the domain name controller, forming a keyword-URL pair. The URL identifies a specific web page that the domain name controller desires to associate with the keyword, such that a properly formatted to request to the domain name 305 that also includes the keyword 310 will automatically redirect the user to URL 315.

URL 315 may be a web page hosted at domain 305, but it need not be. URL 315 may be the address of any web page of any domain that the domain name controller chooses. After receiving the keyword and URL, the keyword management server may store the keyword-URL pair in a database or other file. The keyword-URL pair is associated with the current domain name 305.

In addition to this information, the keyword management server may also gather additional information, or metadata, related to a keyword through, for example, icon 320. This additional information may include, but is not limited to, a description of the URL or a description of the keyword. A URL description may be a business description of the URL that the domain name controller chooses. The description may also be used on keyword statistic reports and other reports generated by the keyword management server.

The interface may also include a brand management component that allows the domain name controller to enable one or more third parties that do not own the domain to provide keywords for the domain. For example, the user may press button 350 to request that the keyword management server generate a suggested list of third parties. The keyword management server may display this list to the domain name controller. The domain name controller may also provide suggested third parties to the keyword management server that are not on the generated list. The brand management component is further described in detail below.

A keyword-URL pair may also be mapped to a location. A location may specify a zip code, a state, an area code, a country, a geo-location code, or some other geographic identifier. For example, a domain name controller may desire to have a different web page display for website visitors located in Hawaii than for website visitors located in Minnesota. A keyword resolution server may receive a geo-location code from a device supporting GPS or may use a source IP address of the website visitor to determine the location of the website visitor. The keyword resolution server may use this information to select a keyword-URL pair. The location allows a domain name controller to run regional advertising campaigns and direct website visitors to the appropriate regional offers.

A keyword may also have associated device metadata. The device may represent, for example, a personal digital assistant (PDA), a smart phone, a laptop, a tablet, etc. The device may enable the keyword resolution server to redirect a website visitor to the web page appropriate for the device type. For example, a domain may have one web page for mobile devices, such as a PDA or smart phone, and another web page for all other devices. The keyword resolution server may be configured to determine the type of device that initiated the keyword resolution request for the provided domain/keyword and use the device type to choose an appropriate keyword-URL pair.

The keyword management server may use keyword type 325 of FIG. 3 to identify keywords with locations or devices. For example, a keyword with a type of "R" may not have any associated locations or devices. A keyword with a type of "L" may have locations associated with the keyword and a keyword with a type of "D" may have devices associated with the keyword.

In step 220, after the content provider or domain name controller has registered, modified, or deleted keyword mapping as necessary, the user may press button 330 to request that the keyword management server generate an appropriate client-executable program for embedding within content provider HTTP responses to enable user-provided URL keywords to be detected and resolved, as further described below. And, in step 225 the appropriate client-executable program, such as a JavaScript program, may be displayed for the user to copy and to place within the content provider's server logic.

Figure 14:
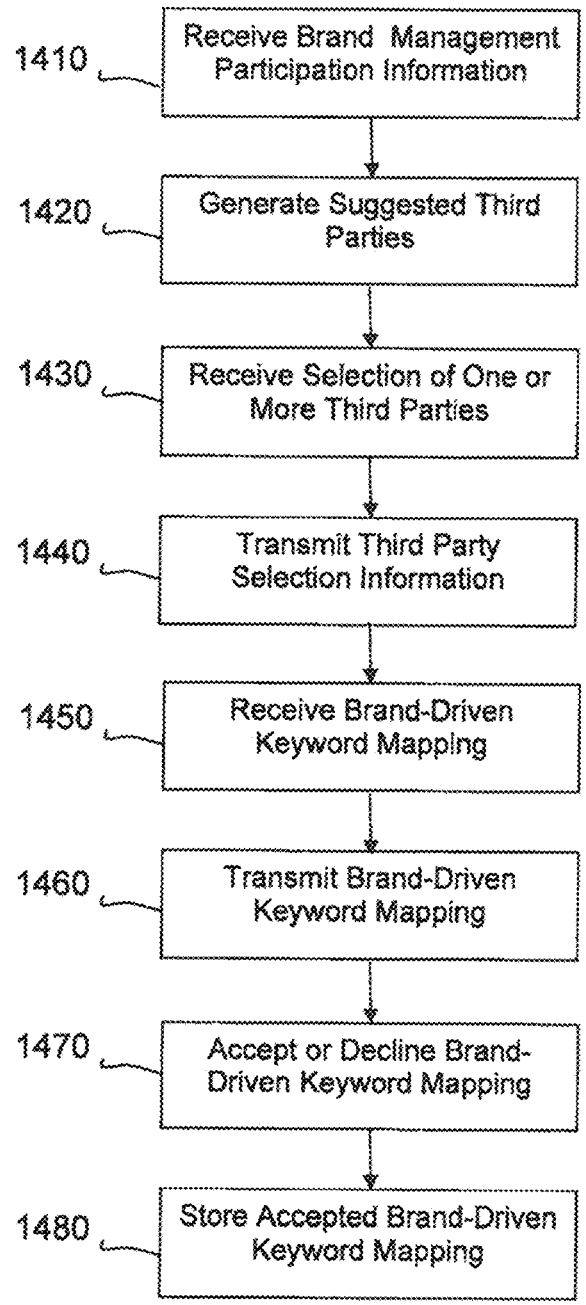
FIG. 14 is flow diagram illustrating exemplary brand management processes performed by a brand management component of the keyword management server, consistent with certain disclosed embodiments.

FIG. 14 is flow diagram illustrating exemplary brand management processes performed by a brand management component of the keyword management server, consistent with disclosed embodiments. In step 1410, the keyword management server may receive brand management participation information indicating that a user acting on behalf of a content provider, such as a domain name controller, wants to participate in brand management by enabling a third party to provide keywords for the domain name. The user may submit the brand management participation information to the keyword management server by clicking on button 350 of keyword management interface 300, or may use any other known method to transmit the brand management participation information to the keyword management server. Clicking on button 350 may redirect the user from keyword management interface 300 to a domain owner brand management interface. An exemplary domain owner brand management interface is shown in FIG. 15. While the domain owner brand management interface is separate from the keyword management interface in this exemplary embodiment, the brand management interface and the domain owner keyword management interface may be combined into a single interface or may be separated into more than two interfaces.

In step 1420, the keyword management server may generate a list of suggested third parties. The list may be generated automatically from the domain name registry or from third parties who have provided information to the keyword management server indicating that the third parties are interested in participating in brand management. The list may be displayed to the user on the domain owner brand management interface, such as section 1510 of interface 1500 shown in FIG. 15. The domain name controller may review the list of available third parties and select one or more of those third parties to enable the third party to propose brand-driven keyword mapping for the domain. If the domain name controller wishes to enable a third party that wasn't displayed on section 1510, the domain name controller may enter the name of that third party using one or more text boxes 1515. The domain name controller may submit the selection of the third party to the keyword management server. For example, the domain name controller may submit the selection to keyword management server by clicking submit button 1514 on interface 1500.

In step 1430, the keyword management server may receive the domain name controller's selection of one or more third parties. The keyword management server may receive the domain name controller's selection of one or more third parties using any known method of receiving data.

In step 1440, the keyword management server may transmit third party selection information to the third parties. The third party selection information may include information relating to the domain name that has authorized the third party to submit proposed brand-driven keyword mappings. For example, the third party selection information may include the domain name, the owner of the domain name, the type of site, and the date and time of the third party authorization. The keyword management server may display the third party selection information on a third party brand management interface, such as the exemplary third party brand management interface shown in FIG. 16.

As shown in FIG. 16, the third party brand management interface may include sections 1610, 1620, 1630, 1640, and 1650. They keyword management server may display domain names that recently authorized the third party to propose brand-driven keyword mappings in section 1610, and may display the names of one or more participants that have accepted one or more of the third party's brand-driven keyword mappings in section 1620. The keyword management server may also display section 1630, which allows a third party to enter a proposed keyword and proposed associated URL to submit to the user as a brand-driven keyword mapping by, for example, pushing submit button 1632. In the example shown in FIG. 16, third party "Alpha Corp." is in the process of submitting the keywords "Alpha," "Alpha Widgets" and "Alpha Merger" and associated URLs to the domain name controller for "Acmecorp.com."

The keyword management server may display keywords approved by one or more domain names in section 1640 and may display brand-driven keyword mappings that were rejected by one or more domain name controllers in section 1650. While not shown in FIG. 16, section 1650 may also include reasons why the domain name controller rejected the brand-driven keyword mapping. For example, the domain name controller may have rejected the brand-driven keyword mapping because the keyword or the associated URL was inappropriate. As another example, the domain name controller may have rejected the brand-driven keyword mapping with the keyword was already in use by the user or by another third party.

Returning to FIG. 14, in step 1450 the keyword management server receives the brand-driven keyword mapping from the third parties. For example, the third party may enter a keyword 1634 and an associated URL 1636 (show in FIG. 16) and submit the brand-driven keyword mapping to the keyword management server by pressing submit button 1632. If the third party wishes to change the brand-driven keyword mapping, the third party would submit the new mapping to the keyword management server for reapproval by the domain name owner. The domain name controller may review each revised keyword mapping, or may "opt out" of approval for trusted third parties. Additionally, the domain name controller may disable the third party from providing keyword mapping at any time.

In step 1460, the keyword management server may transmit the brand-driven keyword mapping to the domain name controller. The keyword management server may then display the brand-driven keyword mapping on the domain owner brand management interface, such as on section 1520 of brand management interface 1500 in FIG. 15. The domain name controller may then determine whether to accept or reject the brand-driven keyword mapping. For example, as shown in FIG. 15, the domain name controller may select a button corresponding to "yes" if the domain name controller accepts the keyword mapping, or a button corresponding to "no" if the domain name controller rejects the keyword mapping. Although not shown in FIG. 15, the domain name controller may also enter comments indicating the reason why the domain name controller chooses to reject a keyword mapping or may also provide proposed alternate keywords or associated URLs to the keyword management server or third party. Additionally, the domain name controller may auto-enable selection by requesting that keyword management server compare the name of the third party to the proposed keywords. If the third party name and the proposed keyword are similar or identical, the domain name controller may direct the keyword management server to automatically accept the proposed keyword mapping. Similarly, the domain name controller may direct the keyword management server to automatically decline the proposed keyword mapping if the name of the third party and the keyword do not match, or if the keyword matches a list of prohibited keywords that is generated by the keyword management server and/or by the domain name controller.

In step 1470, the keyword management server accepts or declines the brand-driven keyword mapping based on the selection of the domain name controller. Once the keyword is accepted or declined, the keyword management server notifies the third party. For example, the keyword management server may display information relating to the approved or rejected brand-drive keyword mapping on third party brand management interface 1600, such as on sections 1640 or 1650.

In step 1480, the keyword management server stores the brand-driven keyword mappings accepted by the domain name controller in a brand-driven keyword registry database. The brand-driven keyword mapping is used to direct a client to a webpage in response to a user-supplied URL keyword that is the same as or similar to the keyword in the brand-driven keyword mapping. The brand-driven keyword registry database may also store additional information related to the brand-driven keyword mapping, such as the identity of the third party, whether the third party has been given permission to automatically update the brand-driven keyword mapping, statistical information, and various other information associated with the brand-driven keyword mapping.

While FIG. 14 shows a process performed using particular steps, embodiments consistent with the invention need not perform all the steps shown in FIG. 14, may perform additional steps, or may perform the steps in a different order.

Figure 4:
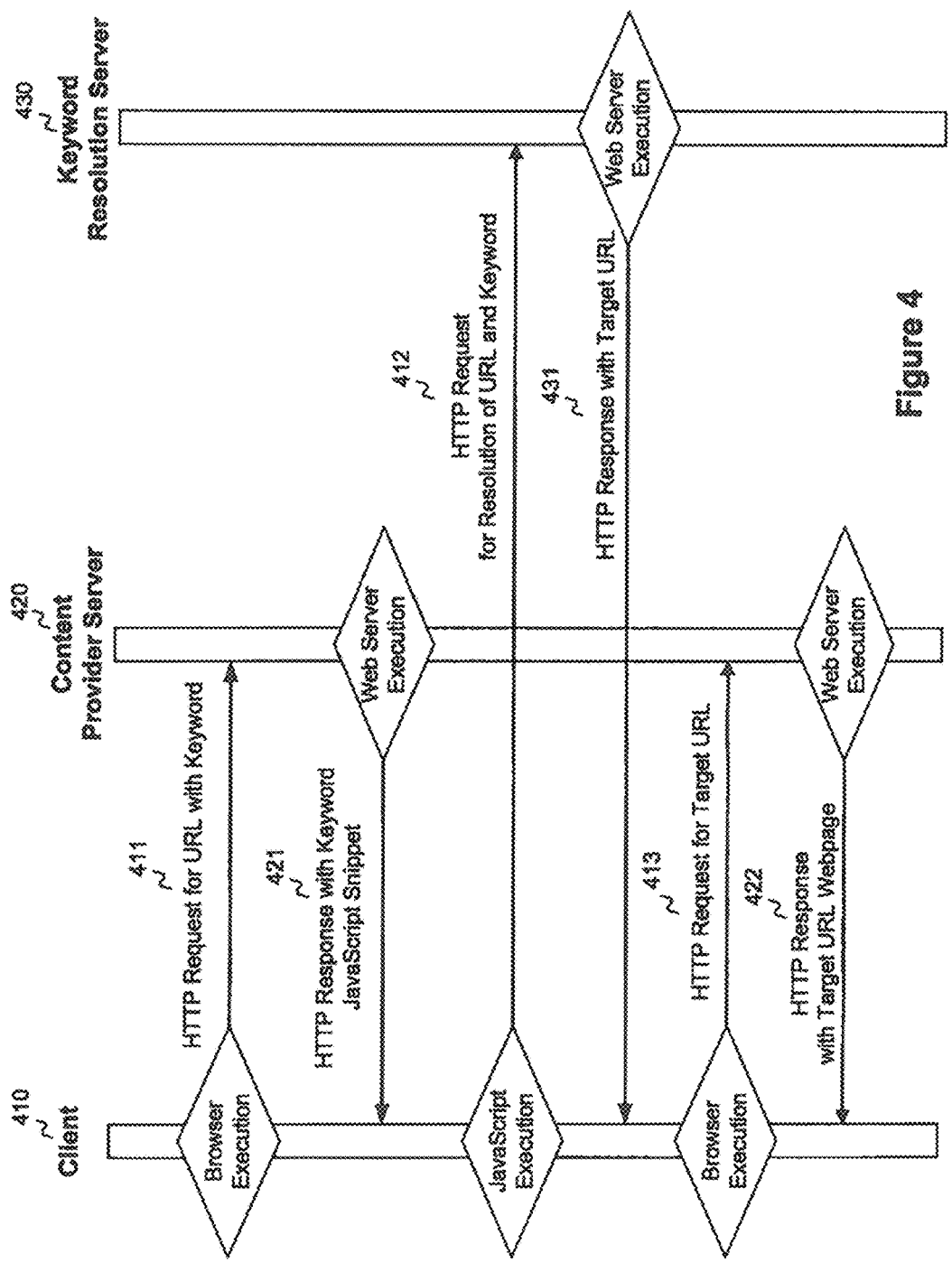
FIG. 4 is a flow diagram illustrating an exemplary method of resolving a user-supplied keyword to a content provider-specified webpage, consistent with certain disclosed embodiments.

FIG. 4 is a flow diagram depicting an exemplary method of directing a client to a webpage in response to a user-supplied URL keyword, consistent with certain disclosed embodiments. In the embodiment depicted in FIG. 4, a client 410, such as an end user, may send an HTTP request to a content provider server 420 for a webpage associated with a URL (step 411).

For example, as depicted in FIG. 5, a user may type the URL 510 "http://www.newnews.com/#earthquake" into the address bar of a browser, which may cause the browser to make an HTTP GET request 600, as depicted in FIG. 6, to a web server 420 that hosts the "www.newnews.com" domain name. Specifically, in response to the user specifying URL 510, the HTTP request 600 from the user's browser may request the resource 610, which corresponds to the root "/" directory from the web server 420 that hosts the domain name 620 "www.newnews.com". Typically, web servers will be configured by to transmit a default HTML file, such as "index.html", in response to a request for the root directory.

URL 510 may comprise a resource string 510*a* and a keyword 510*b*, as indicated by the pound or hash symbol "#". This technique of demarcating URL keywords using hash symbols is similar, for purposes of syntax, to the use of fragment identifiers in URLs, which are defined by the Internet Engineering Task Force's RFC 3986 URL specification.

In conventional use, a fragment identifier may be used to identify a specific section within an HTML page received from a web server and to instruct the browser to navigate directly to that section when rendering the HTML page. For example, within the HTML text of a webpage, the author of the webpage may logically divide the content of the webpage into an "introduction" section, an "analysis" section, and a "conclusion" section. The author may further place the HTML anchor tags '<a href="#introduction">', '<a href="#analysis">', and '<a href="#conclusion">', before the content of the corresponding section. If a user requests a URL that includes the fragment identifier "#analysis" and there exists an HTML anchor tag for the "#analysis" fragment identifier, then the user's browser will not only download and render the HTML of the retrieved HTML document, but will also automatically scroll directly to the section of the HTML document that is preceded by the "#analysis" fragment identifier. Thus, conventionally fragment identifiers are processed entirely within the browser, as depicted in FIG. 6, are not included in the specified resource 610 of the browser's HTTP request 600 to the web server, and are processed after the content is retrieved via HTTP request 600. Furthermore, the conventional use of fragment identifiers does not generate additional HTTP requests and is only used to decide what portion of the content returned is displayed to the user when rendering is performed in the browser.

As further described below, however, the syntax of the fragment identifier may be used instead to indicate a URL keyword in accordance with the present invention. That is, the fragment identifier 510*b* "#earthquake" may not indicate that the user is specifying to the browser an initial scrolling focus on a section of the webpage anchored by the text "earthquake", but rather that the user is requesting that content provider server 420 respond by directing the user to whatever specific webpage the content provider has designated for the keyword "earthquake", which may be a webpage different from the webpage that was initially requested. In situations in which there is a conflict such as when the content provider is using the fragment identifier as both an anchor to an initial page and as a method to direct users to a specific webpage, the content provider and/or the keyword resolution service may determine whether or not to make the anchor or the keyword dominant. For example, the keyword resolution service may automatically honor the anchor if there is no conflict with a keyword, and if there is a conflict, the keyword may take precedence. Thus, the client would be directed to the specific webpage.

Continuing with this particular example, the user may have heard of a recent significant world event involving an earthquake in some foreign country. And, the user may further have desired to consult the website www.newnews.com for information about the event. However, rather than first going to the newnews.com homepage and either searching for articles discussing earthquakes, which might range from scientific explanations of earthquakes to historical summaries of earthquakes, or attempting to navigate through traditional navigation techniques, such as menus and subdirectories to find information on the recent earthquake (for which the user might not have enough information, such as the relevant country, to even know where to begin looking), the user may instead simply specify a base domain name 510*a* and a keyword 510*b* for the topic sought in a URL.

By causing a browser to make an HTTP request to this base domain name/keyword combination, the user is essentially requesting that a web server that hosts the www.newnews.com domain name provide the user with whatever specific webpage that the NewNews content provider has designated for that keyword. For example, once the NewNews content provider becomes aware of a major foreign earthquake, its editorial staff may create a webpage that details all of the pertinent information that it believes users would seek if looking for a webpage that provides a basic overview of the recent earthquake news event. Once that webpage is created and assigned a URL, such as URL 315 of FIG. 3, editorial, or other non-technical, content providers may log into the keyword system interface 300 to register the new keyword "earthquake" for the www.newnews.com domain name and to associate it with URL 315.

FIG. 5 depicts other potential forms of URLs in which keywords may be embedded consistent with embodiments of the present invention. For example, as in URL 520, which may be a preferred embodiment, a keyword (here, "anvil") may be embedded in any form of URL for which a browser may have sufficient information to make an HTTP request, and therefore the scheme or mechanism (here, "http") may not be present, and the root directory "/" symbol may also be omitted between the domain name and the keyword. In the example of URL 520, a user may append a keyword to the domain name of an online retailer (here, "acmecorp.cc") in order to request a content provider-designated webpage for a particular type of product for purchase (here, "anvil").

As shown in URL 530, a keyword may comprise non-allowed URL characters, such as spaces, which may undergo URI encoding prior to transmission in an HTTP response in order to use separate, space-delimited words or to include special characters, such as non-ASCII characters. In the example of URL 530, a user may append a keyword to the domain name of a local business (here "momandpopshop.com") in order to request a content provider-designated webpage for information about a particular promotion or event (here, "green light special") that is occurring at the local business.

As shown in URL 540, a keyword may also include wildcard, regular expression, or other characters to allow for flexible string matching of keywords; or may include alternative keywords, for example, in which alternatives are separated by a pipe "|" character. URL 540 also demonstrates that a keyword need not follow a domain name directly, but may instead be placed within a directory structure or other path within the URL. A keyword placed within a path may be handled in a variety of ways. For example, the keyword may be given preference over any path information such that any path in the URL is simply ignored if a keyword is found.

Alternatively, any path that precedes a keyword may limit the scope or otherwise provide a relevant name space for that keyword. For example, a content provider may designate a first webpage for the keyword "admission" if it is placed within the "/students/undergraduate/" path in a URL (e.g., providing admissions information for undergraduate students) and a second webpage for the keyword "admission" if it is placed within the "/students/graduate/" path in a URL (e.g., providing admission information for graduate students). Similar techniques may be employed for content providers that offer "vanity" URLs within a single domain name to various different companies or organizations. For example, in the case of Facebook.com, which offers vanity URLs, such as "www.facebook.com/cocacola" or "www.facebook.com/toyota", the same keyword (e.g., "#2011 challenge") may be linked to different webpages depending on whether it occurs within the "/cocacola" path or the "/toyota" path.

In the example of URL 540, a user may append a keyword to the domain name of a university (here, "www.vanderbilt.edu") or other non-profit organization (and further within a path following the domain name) to request a content provider-designated webpage for general information (e.g., a table of contents) about a particular subject (here, "admissions").

As shown in URL 550, a keyword may also be embedded within or appended to a query string within a URL. Similar to URL 540, the query string within URL 550 may be either ignored once a keyword is detected or may provide a name space within which the keyword has a separate or distinct meaning. In some embodiments, a URL query string may simply provide additional parameters to be applied to any webpage returned in response to a user-specified keyword, such as an instruction that such a webpage should be provided in a particular language (here, "fr" for French) or in a particular format (here, formatted for a display on a mobile device). In the example of URL 550, a user may append a keyword to the domain name of an online information service provider (here, "site.netops.globalsecuritiestrade.org") to request a content provider-designated webpage that provides status or real-time information about a particular topic (here, "ETFs").

As shown in URL 550, a keyword may be appended to a domain name that includes multiple sub-domain names. And, similar to the path of URL 540, the specificity of the preceding domain name may define a name space within which the keyword has a separate or distinct meaning. For example, a content provider may designate a first webpage for the keyword "ETFs" if it follows the more generic second-level domain name "globalsecuritiestrade.org" (e.g., providing information about ETF products in general) and a second webpage for the keyword "ETFs" if it follows the more specific sub-domain "netops.globalsecuritiestrade.org" or any other sub-domain within that sub-domain (e.g., providing real-time trading prices for various exchange traded funds). While FIG. 5 shows URLs including top-level domains, second-level domains, third-level domains, and fourth-level domains with the fragment identifier and keyword following the top-level domain, embodiments consistent with the present invention may implement the fragment identifier and keyword at any domain level within the URL and/or implement the fragment identifier in URLs including one or more of any domain level.

And, as shown in URL 560, multiple keywords 560a, 560b, and 560c may be placed in a URL. In the example of URL 560, a user may append multiple keywords to the domain name of an online retailer to request one or more content provider-designated webpages for particular product names. Various techniques could be employed for processing multiple keywords, including processing each keyword to determine whether a match exists and providing a webpage in response to the first keyword that has a designated webpage; assigning priority orderings for various keywords and providing the webpage designated for the highest ranked keyword in the URL; or providing specific webpage mappings for distinct keyword combinations (e.g., a first webpage for keyword 560a, a second webpage for keyword 560b, a third webpage for keyword 560c, and a fourth webpage for the combination of keywords 560a, 560b, and 560c).

Other techniques or syntax may be used to identify URL keywords. For example, a URL keyword may alternatively be identified by one or more characters, such as "$", "!", or "@", that are not valid URL characters unless converted to hexadecimal format. However, since such characters may also be used to define file names or valid paths within a URL, in some embodiments it may be preferable to use the hash symbol instead, since most web browsers are configured to omit any fragment identifiers (identified by the hash symbol) from an HTTP request, and thus there may be no danger that a web server that did not provide functionality for domain-specific keywords would attempt to locate a file that actually contained the keyword text in its file name.

A URL keyword of the present invention may also include international or special characters that are otherwise disallowed for URLs, since any such characters may simply be converted to hexadecimal form by the user's browser prior to transmission in an HTTP request. For example, a content provider, such as a bookseller that desires to create a keyword webpage for books directed to résumé drafting may create a keyword that uses the appropriate international characters, knowing that users may similarly specify the keyword "#résumé", which may be subjected to URI encoding to become "#r%C3%A9sum%C3%A9" by users' browsers when HTTP requests are made.

Returning to FIG. 4, in step 421, content provider server 420 receives HTTP request 610 and responds by transmitting an HTTP response 700, as depicted in FIG. 7. HTTP response 700 includes both header information 710 and payload data 720. Because keyword 510b may not be included in HTTP request 600 to content provider server 420 (since, when formatted as a fragment identifier, it may be omitted by the client's browser), at this point, content provider server 420 may not know whether the request for "www.newnews.com/" is meant as an actual request for a the root webpage at www.newnews.com or was merely used to specify the domain name for a domain-specific keyword. Therefore, content provider server 420 may transmit a payload 720 that includes the HTML text for the "index.html" file on the server.

However, in order to allow for the possibility that client 410 may be requesting a domain-specific keyword, content provider server 420 may also include a small amount of client-executable code within the HTML document/payload 720, such as, for example, "<head>" section 721. While in this exemplary embodiment the client-executable code is included within the "<head>" section, the client-executable code may be included anywhere in the HTML document. The client-executable code may comprise a JavaScript® or other client-executable program 721b the contents of which are provided directly by content provider server 420. Alternatively, content provider server 420 may include only a link 721a to a program file that resides on another server, such as keyword resolution server 430. Using this approach, client 410 may make a separate HTTP request to keyword resolution server 430 for the program file specified by link 721a, and, once the program file is received, may execute the program file within the client's browser program.

In step 412, client 410 may execute the client-executable program, for example, under a browser rule that any scripts contained within the "<head>" section 721 are to be executed prior to parsing or rendering any content in the "<body>" 722 section of the HTML document 720. The client-executable program may identify any URL keywords that the user included in the requested URL. For example, if keywords are formatted as fragment identifiers, because the client-executable program is executed within client 410, as opposed to on the content provider server 420, the client-executable program may have access to such fragment identifiers. In the example of URL 510, the client-executable program would identify the "#earthquake" fragment identifier as a domain-specific keyword.

In step 412, in response to identifying the presence of one or more domain-specific keywords, the client-executable program may cause client 410 to make a separate HTTP request to a separate keyword resolution server 430 to request the URL for the specific content provider-designated webpage for the keyword or keywords. For example, as depicted in FIG. 8, in the case of URL 510, client 410 may make an HTTP GET request to keyword resolution server 430 using URL 800. URL 800 may include the domain name 810 of the keyword resolution server; the path 820 of a server-side script on keyword resolution server 430 capable of performing keyword-lookup operations; and a query string 830 that specifies both the original URL 830a and the domain-specific keyword 830b requested by client 410.

For example, the client-executable program may make a synchronous or an asynchronous HTTP request to the keyword resolution server 430 using Asynchronous JavaScript and XML ("AJAX") or JQuery techniques known by those skilled in the art. The client-executable program may also make an HTTP request to the keyword resolution server using an HTML "<IFrame>" element or an HTML "<script>" element that has a target pointing to a URL hosted by the resolution server. Those skilled in the art will appreciate other means for providing the user-requested URL and domain-specific keyword to keyword resolution server 430 for resolution.

In 431, keyword resolution server 430 may determine which specific webpage, if any, on the content provider's website has been designated to be served for the requested keyword, and provide the target URL corresponding to that specific webpage back to the client. For example, in the case of URL 510, keyword resolution server 430 may provide client 410 with the URL 900, as depicted in FIG. 9, which is the same URL that the content provider had specified as URL 315 in the keyword specification interface 300. Keyword resolution server 430 may provide URL 900 to client 410 as a simple text string in an AJAX response. Alternatively, keyword resolution server 430 may redirect client 410 to URL 900, for example using an HTTP 301 or 302 Redirect.

In step 413, client 410 may make a new HTTP request to content provider server 420 for the target URL provided by the keyword resolution server. For example, client 410 may make an HTTP request to content provider server 420 for the webpage associated with URL 900. And, in response, content provider server 420 may provide an HTTP response that includes the HTML text for the webpage specified by URL 900, thus providing client 410 with the webpage that the content provider has designated for the keyword "earthquake." The client may then render and display the webpage specified by URL 900 in the main browser window for the user to see and interact with.

The foregoing technique for providing content provider-designated webpages in response to user-specified keywords presents several additional benefits that merit brief treatment here. Clients may use existing browser programs request domain-specific keyword webpages without any need to modify or enhance the functionality of the browser programs, such as by browser plugin or add-on. Rather, to practice the present invention, browsers need only provide users with the ability to include fragment identifiers in URLs and include basic functionality for executing client-executable programs such as JavaScript®.

Content providers may likewise implement domain-specific keyword functionality in response to HTTP requests with only trivial modifications to existing server-side scripts or programs. Specifically, a content provider need only include a small amount of client-executable code within each webpage in a domain for which the content provider wishes to provide domain-specific keyword functionality. The content provider may then leave it to the client's browser and the relevant keyword resolution server to perform the actual keyword resolution operations. In fact, provided the content provider includes the requisite client-executable program in HTTP responses for webpages, the content provider's servers may remain completely agnostic as to whether a client has either requested a domain-specific keyword or is making a request for a specific webpage in response to a previous keyword resolution. Because the content provider server always returns any requested webpages along with the client-executable keyword resolution program, the content provider can ensure that clients that requested webpages in order to actually render them receive such webpages, whereas clients that request webpages merely as a means of specifying a domain name space for a particular URL keyword are provided with the client-executable program necessary to resolve the keyword.

Similarly, by using the syntax of fragment identifiers to specify domain-specific keywords, users can make HTTP requests that include URL keywords to any content provider, whether or not that content provider is keyword-capable, without any danger of generating server response errors. Because browsers do not transmit fragment identifier text to web servers, the inclusion of a domain-specific URL keyword in an HTTP request to a web server that is not keyword-capable should not generate any errors, but should instead simply result in the webpage of the URL, without the fragment identifier, being downloaded and displayed. And, even for web servers that are keyword-capable, if the user specifies a domain-specific keyword for which the content provider has not designated a webpage, the keyword resolution server may simply provide an empty string in response to a resolution query, once again resulting in the webpage of the base URL being downloaded and displayed.

In the case where a keyword is found to correspond to a content provider-designated webpage, because the executable code for requesting a resolution of the keyword and redirecting the client to the resolved target URL is within the "<head>" section of the original HTML document returned by the content provider server, such code may be executed before any rendering of the original HTML document takes place. Thus, user should never see the originally requested HTML document displayed, even if only briefly, but it should appear to the user as though he or she went straight to the webpage associated with keyword.

Also, the use of a separate keyword resolution server, along with a keyword management interface 300, allows non-technical employees of a content provider to create, modify, or delete keyword-webpage mappings as business needs dictate without the need to involve technical employees such as IT personnel. Indeed, since the content provider itself can maintain the keywords without the need for any specific IT skills, costs can be reduced. Furthermore, content changes quickly and existing traditional navigation techniques would require an IT professional to reconfigure the web server.

In another embodiment, a content provider itself may perform the role of keyword resolution service provider. In particular, the client-executable program provided by the content provider server to the client may instruct the client, after identifying one or more URL keywords, to query the content provider itself, rather than a separate keyword resolution server, for the content provider-designated webpages corresponding to the identified keywords.

The present invention is not limited to circumstances in which a user manually types a domain-specific keyword into a URL. Rather, the domain-specific keyword may be included in a requested URL in any manner, such as being specified within a hyperlink in an existing HTML document, being included in navigation "bookmark", being provided by a web server, such as in the form of an HTTP Redirect, or being included within a native mobile phone application.

The present invention may also allow users to use wildcards or regular expressions in keywords, such as "engineer", which may resolve to "engineer," "engineers," "engineering," "engineering schools," etc. In some embodiments, if there are a sufficient number of potential resolutions for a wildcard or regular expression keyword, the user may be prompted with a list of choices.

Those skilled in the art will also appreciate that although both the originally requested base URL of step 411 and target URL of step 413 may be hosted by the same content provider entity, the resources hosted by the respective URLs may be hosted by separate web servers. Also, although described predominantly in this application as "domain-specific" keywords, those skilled in the art that the concept may be expanded to provider-specific keywords. For example, a single content provider may own and host the distinct domain names "zulumail.tv" and "zmail.tv", both of which are directed to the same hosting service or are hosted by the same web servers. And, the content provider may designate a single webpage for the keyword "#forwarding", regardless of whether it is requested by a user as part of a URL based on either domain. That is, both "http://zulumail.tv/#forwarding" and "http://zmail.tv/#forwarding" might resolve to the URL "http://zmail.tv/user_options/mail_handling/automatic_forwarding.htm".

Similarly, the concept may be expanded to allow a first content provider to designate another content provider's webpage for a given keyword. For example, if a number of smaller weather-related websites rely on a larger service provider to supply real-time weather information, the content provider responsible for each smaller website may designate a webpage hosted by the larger service provider for the keyword "#storms".

In other words, a content provider is not limited in any way to the specific webpage that it may designate for a given keyword. However, as described with respect to FIG. 2, a content provider may be limited in that it may not designate keywords for websites or domains that it does not either own or control or have authority over. And moreover, a given content provider-designated keyword may have a meaning only within a specific domain name, which also may include a URL path, a query string, and/or a port number.

Figure 10:
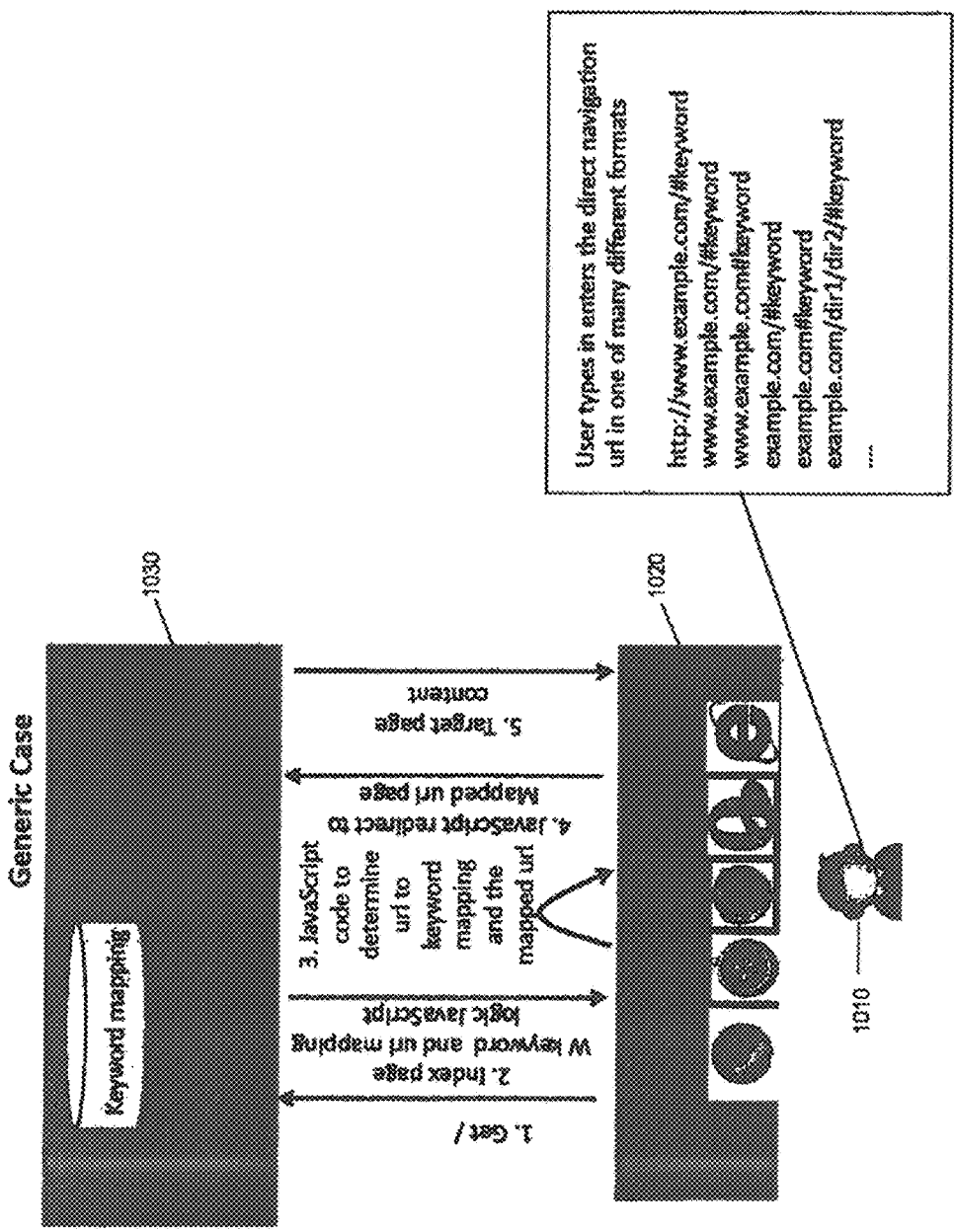
FIG. 10 is an exemplary implementation of an exemplary embodiment consistent with the present invention.

Furthermore, there are a number of implementation options for embodiments of keyword/URL mappings. As shown in FIG. 10, in the generic case, a user 1010 may input a direct navigation URL, such as "example.com#keyword," into a browser 1020, causing the browser 1020 to make an HTTP GET request to the example.com server 1030. In response to the user specifying the direct navigation URL, the GET request from the browser 1020 may request the resource that corresponds to the root "/" directory from the server 1030 that hosts the domain name "example.com." Generally, web servers transmit a default HTML file, such as "index.html," in response to a request for the root directory, along with the requisite keyword/URL mapping and keyword resolution program, such as, for example, a JavaScript code. Browser 1020 may then implement the keyword resolution program to determine the URL to keyword mapping and the mapped URL. The Browser 1020 may then transmit a request to the server 1030 for the mapped URL page, and in response to the request, the server may return the target page (i.e., the page associated with the keyword). Alternatively, the content provider server could request resolution, or instruct the client to request resolution, of the keyword from a separate server, such as a keyword resolution server.

Figure 11:
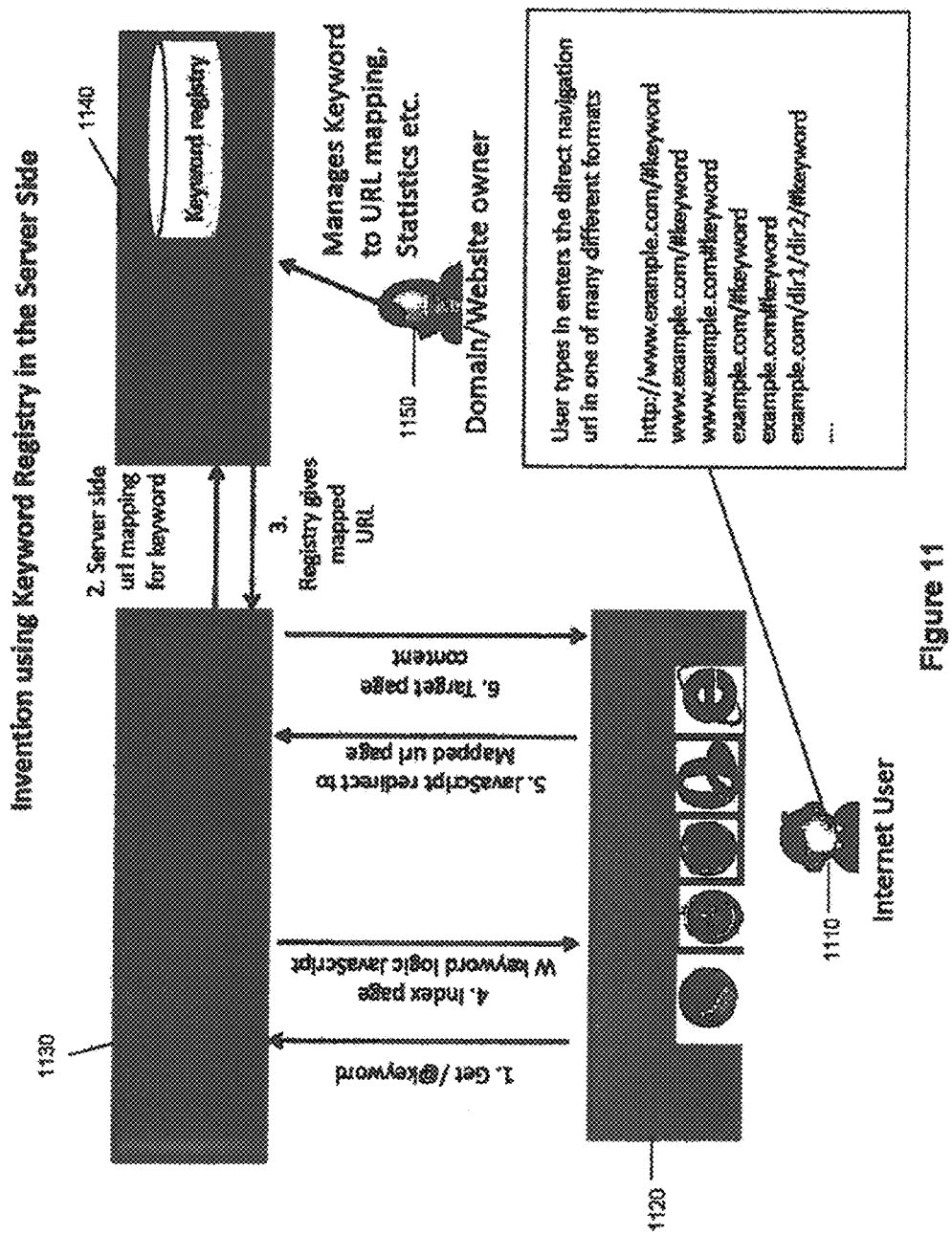
FIG. 11 is an exemplary implementation of keyword/URL mapping on the server side consistent with the present invention.

The keyword/URL mapping can be performed in a number of ways. For example, the keyword/URL mapping can be performed on the server side, be cloud-based, or performed on the client side. FIG. 11 is an exemplary implementation of keyword/URL mapping performed on the server side. As shown in FIG. 11, there may be an internet user 1110, a browser 1020, a server 1130, and a keyword registry 1140. The keyword registry 1140 may be configured by a domain owner 1150 in a way that the domain owner 1150 associates the keyword to a particular website in the domain, and may be a separate server or may be part of server 1130 itself. Additionally, a brand-driven keyword registry (not shown) may be separately provided, or may be combined keyword registry 1140.

As shown in FIG. 11, user 1110 may input a direct navigation URL, such as "example.com#keyword" into browser 1120. The browser 1120 may translate the "#" to some other character, such as "@" and make a request to the server side using the keyword and the new character. Server 1130 may then communicate with keyword registry 1140 to determine the URL mapped to the keyword, and the server 1130 may transmit a default HTML file, such as "index.html," in response to the request along with a keyword resolution program, such as, for example, a JavaScript code. Browser 1020 may then transmit a request to the server 1130 for the mapped URL page, and in response to the request, the server may return the target page.

Figure 12:
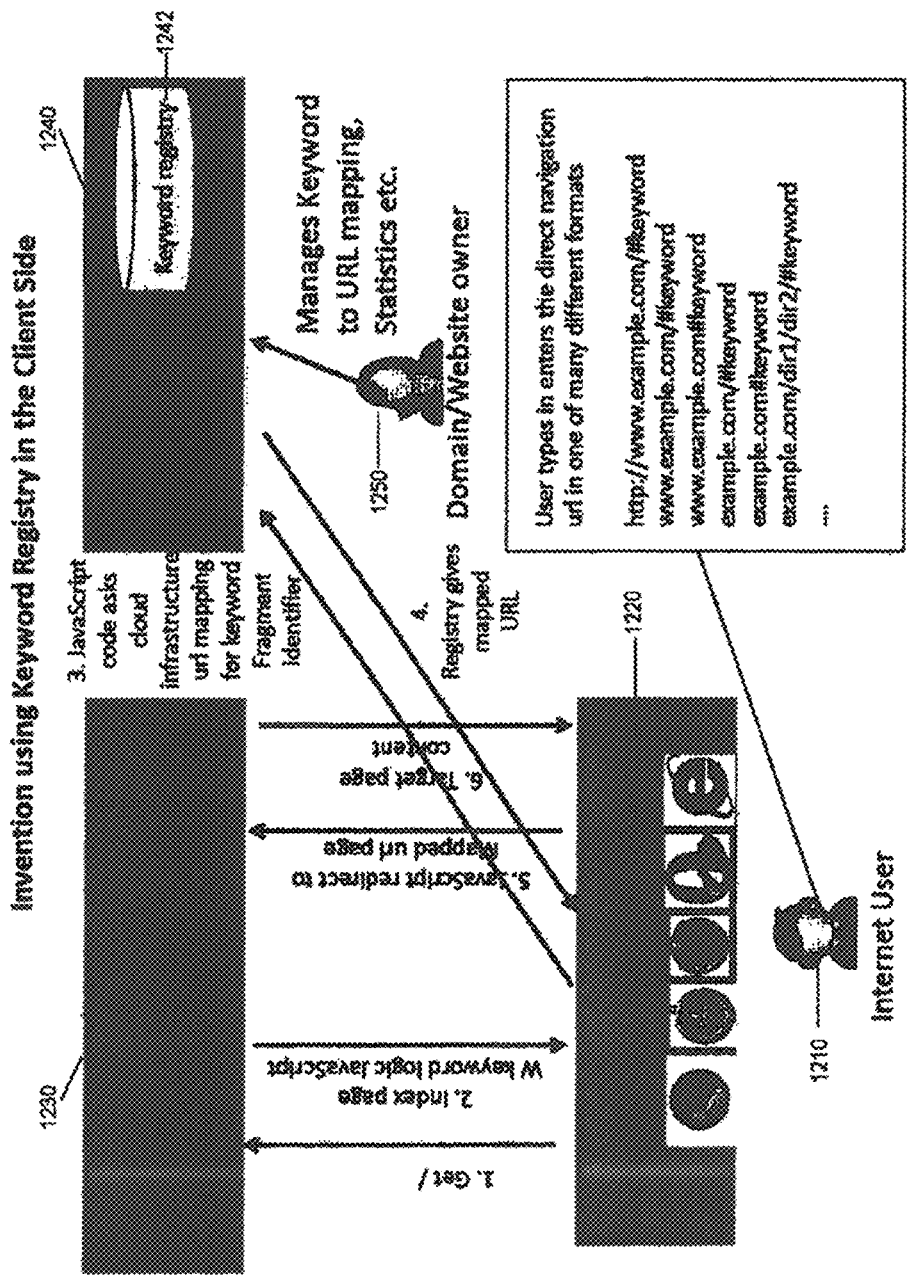
FIG. 12 is an exemplary implementation of keyword/URL mapping on the client side consistent with the present invention.

FIG. 12 is an exemplary implementation of keyword/URL mapping performed on the client side. As shown in FIG. 12, a user 1210 may input a direct navigation URL, such as "example.com#keyword" into browser 1220, causing the browser 1220 to make an HTTP GET request to the example.com server 1230. In response to the user specifying the direct navigation URL, the GET request from the browser 1220 may request the resource that corresponds to the root "/" directory from the server 1230 that hosts the domain name "example.com." Generally, web servers transmit a default HTML file, such as "index.html," in response to a request for the root directory, along with the requisite keyword/URL mapping and keyword resolution program, such as, for example, a JavaScript code. Browser 1220 may then implement the keyword resolution program to communicate with a cloud infrastructure 1240 that may include a keyword registry 1242. The cloud infrastructure 1240 will determine the URL to keyword mapping and the mapped URL, and will transmit the mapped URL to browser 1220. The browser 1220 may then transmit a request to the server 1230 for the mapped URL page, and in response to the request, the server may return the target page.

Keyword/URL mapping may also be performed entirely on the client side. In some embodiments, a client may maintain a local file system or database for the resolution of URL keywords, rather than relying on either the content provider or a third-party resolution service provider to resolve keyword/URL mappings. For example, HTML 5 allows for client-executable code, such as JavaScript®, to access or query a local database in order to retrieve data or content. The client-executable program received from the content provider may rely on such a local database to look up the mapping between a keyword and URL, and, once the relevant URL is located, may direct the browser directly to the URL, thus cutting out at least one HTTP request from the client to a remote server from the process. In other embodiments, the client-executable code can itself generate the local file system or database for the resolution of URL keywords.

Figure 13:
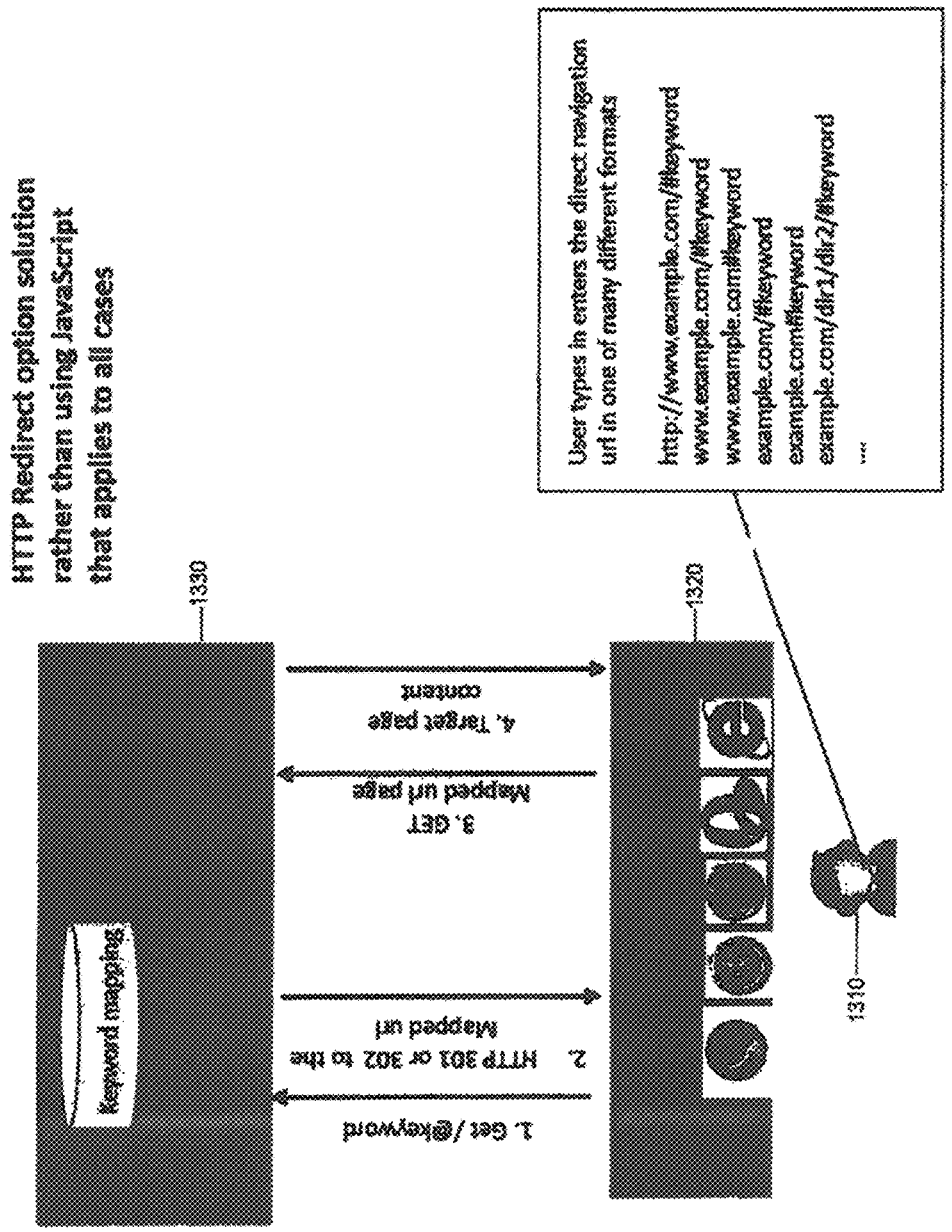
FIG. 13 is an exemplary implementation of keyword/URL mapping using HTTP redirect.

In another embodiment, URL keyword resolution operations may be performed entirely on the server side without relying on the client to execute any client-executable code. For example, as shown in FIG. 13, a user 1310 may input a direct navigation URL, such as "example.com#keyword," into browser 1320. If the URL keyword is delimited by a character other than a hash symbol (e.g., a "@" character), then, unlike the fragment identifier, the keyword may be transmitted to the content provider server 1330 as part of the client's 1320 initial HTTP request. The content provider server 1330, for example, may identify the keyword, determine the appropriate URL mapping for the keyword, and redirect the client 1320 (e.g., using an HTTP 301 Redirect instruction) to the appropriate URL for the keyword, all without relying on the client 1320 to execute any client-executable code. Alternatively, the content provider server could request resolution, or instruct the client to request resolution, of the keyword from a separate server, such as a keyword resolution server.

In another embodiment, if a client requests a keyword that has not been created or designated by a content provider, the client-executable program, keyword resolution server, or content provider server may provide for certain default options. For example, in response to a request for a non-existent keyword, the client may simply render the webpage identified by the base URL of the initial HTTP request. Alternatively, the client may be provided with a webpage, JavaScript alert, or other notification that the user has requested a non-existent keyword. The user may also be provided with a list of potentially similar existing keywords that the user may select in lieu of the non-existent, originally requested keyword. The user may also be provided with a traditional list of webpages generated using traditional keyword searching techniques. The user may also be prompted with a list of potential matching keywords from which the user may select.

In yet another embodiment, if a user inputs the hash tag to request a keyword the content provider, a hash module may provide a list of all of the available keywords associated with a particular domain. For example, the hash module may be a browser add-on or plugin that determines in real-time whether or not a user has entered a hash tag into the address bar of a browser. If so, the auto completion module will communicate with one or more of the content provider, client-executable program, keyword resolution server, or content provider server to determine whether any keywords associated with that particular domain. The more alphanumeric characters entered by the user into the browser, the narrower the list of available keywords associated with the particular domain. If there are keywords associated with the domain, the hash module may generate a pop-up list including those key words. If there aren't keywords associated with the domain, the hash module may redirect the user to a search service page.

In another embodiment, a smart navigation module may be provided to inform a user if a particular domain has keyword smart navigation. For example, the smart navigation module may be a browser add-on or plugin that reviews, in real-time, a domain input into an address and determines whether or not that particular domain has associated keywords by communicating with one or more of the content provider, client-executable program, keyword resolution server, or content provider server. If so, the smart navigation module may provide an indication that the domain has associated keywords such as, for example, changing the color of the address bar or inserting a particular graphic into the browser or associated webpage.

The resolution service provider, in addition to providing a keyword management interface and/or keyword resolution service, may also provide content providers with access to rich metrics and statistics concerning keyword resolution requests from clients. For example, the interface 300 of FIG. 3 may also allow a user and/or content provider to view and/or download the number of times that each created keyword has been requested from clients. As another example, the resolution service provider could track how many times keywords have been used, who used the keywords, the type of keyword used, the websites visited, and various other information using, for example, cookies. Interface 300 may also provide information about the number of requests for various non-existent keywords by users, thus allowing the content provider to determine the need for creating additional keywords as a result of user demand. Such non-existent keyword information may also comprise information about misspellings of existent keywords to inform the content provider of the need to create additional keywords to account for misspellings or homophones of existing keywords or to improve upon permissible wildcard or regular expression matching functionality. Similar information may be provided to third parties in the brand-driven approach.

The resolution service provider may also provide malware-free secure navigation. Since the number of websites available on the internet is so large, it's practically impossible to scan all of them for malware. However, since the resolution service provider knows the URL associated with a particular keyword, the resolution service provider could scan the URL to determine whether its free of malware using, for example, the systems and methods for malware detection and scanning disclosed in U.S. patent application Ser. Nos. 12/982,508 and 12/982,540, the entire contents of which are incorporated herein by reference in their entireties. Accordingly, when a user enters a direct navigation URL such as "example.com#keyword" into a browser, the user has a high level guarantee that the URL is safe for browsing and doesn't include malicious content.

In another embodiment, one or more of the content provider, the client-executable program, keyword resolution server, or content provider server may automatically optimize a particular website based on an identification of the client device. For example, the client-executable program may identify the user's device (e.g., a mobile phone) to forward the user to the particular device's version of the website. The client executable program may automatically optimize the website using, for example, the method discussed in U.S. patent application Ser. No. 13/078,680 filed on Apr. 1, 2011 entitled "Systems, Apparatus, and Methods for Mobile Device Detection", which is hereby incorporated by reference in its entirety.

II. Name-Space-Based Smart Navigation

Various embodiments consistent with the present invention utilize names from general name spaces, including non-DNS (e.g., non-URL) name spaces. That is, disclosed embodiments can work with any name space (and even more than one name space at a time). In general, a name space includes names, and a name owner has authority for a name space (or subspace), where that authority can in some cases be delegated. Name spaces can be public or private, hierarchal or flat. Specific, non-limiting examples of name spaces follow.

The collection of all top-level domain names forms a name space. Further, certain sub-collections of all domain names form name spaces, such as the collection of all second-level domains of a top-level domain, third-level domains, all sub-domains, etc. The term "domain" in "domain name" refers to the fact that each name has an "owner" that is authoritative for a "space" associated with the name. In traditional DNS, which has a hierarchical structure, the name owner is authoritative for any subdomains under the domain, e.g., the owner of "example.com" is authoritative for "a.example.com", "b.example.com," etc. The name owner may delegate authority for those subdomains to another party, but it is the name owner's authority over its "domain" that is delegated.

Many non-DNS name spaces exist. For example, the TWITTER™ name space is a non-DNS, flat, public name space. TWITTER is a microblogging service through which users can share short messages with their followers. Each TWITTER account has a unique name or "handle," a string beginning with the "@" character, such as "@example_brand".

Other example name spaces include the FACEBOOK™ name space and the LINKEDIN™ name space. Regarding these resources, in general, a user can navigate to an example user's page by entering a URL of the form, respectively, http://www.facebook.com/example_user_name or http://www.linkedin.com/example_user_name. The form of these URLs provides name spaces consisting of all names of the form example_user_name for which an account exists in the respective resource.

Another name space is the space of email addresses. Embodiments disclosed herein can allow a general user look up information such as an example user's personal home page by email address, using a command string in a form such as "user@example.com!home", wherein "user@example.com" is an email address.

Yet another example is the name space defined by shortened URLs. Shortened URLs have been adopted as abbreviated versions of potentially long and complex URLs. They typically have the form "name/code" where "name" is a short domain name and "code" is a short string identifying a particular reference to the full URL. An entry of the form "bitly:name/code!keyword" may be processed by a navigation service according to embodiments disclosed herein as a way to lookup additional information about a shortened URL or the resource it refers to.

Examples of private name spaces include lists of users within a company, and lists of resources and/or devices within a local-area network, such as in a user's home.

For clarity of explanation, various embodiments are described herein in the context of a use case where the owner of a brand (e.g., Gimbels) also is the registrant for a domain corresponding to that brand (e.g., ".gimbels"). The invention, however, is not solely limited to this context and has applications far outside of this context.

Figure 17:
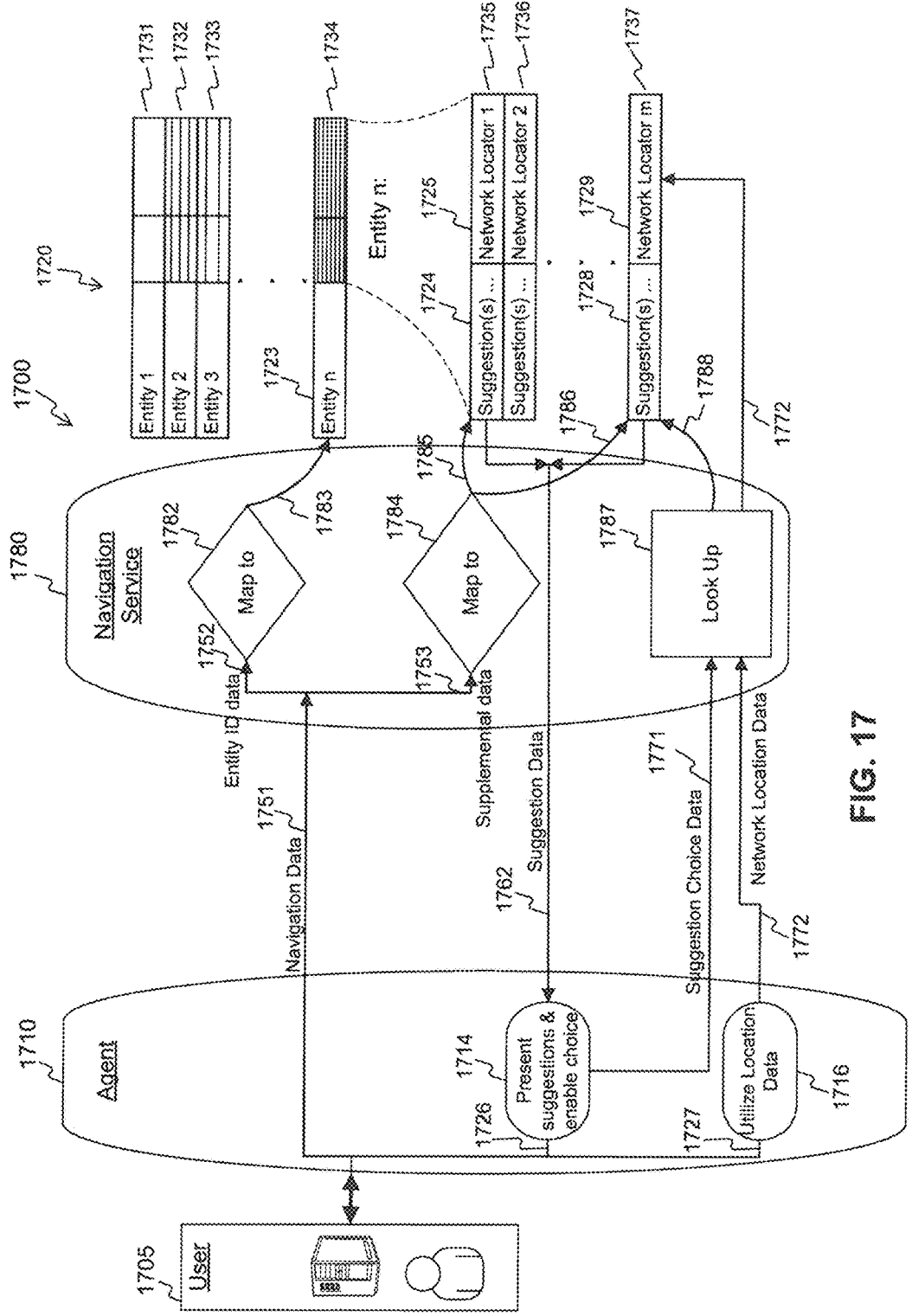
FIG. 17 illustrates an example of a system and method for navigating from an agent to a desired network resource, consistent with the principles of the invention.

FIG. 17 illustrates an example of a system 1700 for navigating by an agent 1710 to a desired network resource, consistent with the principles of the invention. Complementary methods are described along with the description of FIG. 17. As shown, system 1700 includes a user 1705, which communicates with an agent 1710, which communicates with a navigation service 1780.

In various embodiments, the user 1705 may be anything that can provide input navigation data 1751 characterizing, regarding, specifying or otherwise describing a desired network resource and that can provide input data 1726 specifying or selecting at least one presented suggestion 1714 (described further below). The user can specify the navigation data 1751 by, for example, typing it into an appropriate field, clicking on a link that has a compatible syntax, or speaking into a microphone that can capture sounds reflecting such data. One example of input navigation data 1751 may be the string of characters "gimbels shoes". In some embodiments, the user 1705 may be a human user or a computing system programmed to perform the functions of providing input navigation data 1751 and input data 1726.

Thus, a user 1705 can be a computer or executing computer code. Such a user can provide any, or a combination, of input navigation data 1751, selection choice data 1771, and input data 1726. For example, executing computer code (e.g., an application) can navigate to content associated with one or more defined keywords in an automated way by providing navigation data 1751 to a navigation service 1780 in an automated manner. Such executing computer code does not require human interaction at the time that it provides navigation data to the navigation service.

In various embodiments, the agent 1710 (also referred to as a "navigation client," which is one example of an agent 1710) may be anything that can interact with the user 1705 and with the navigation system 1780 as described herein. In some embodiments, the agent 1710 may also connect to and interact with network resources specified by network location data 1772 or by network locators 1735-1737. The agent 1710 generally accepts, receives, obtains or otherwise accesses input data from the user 1705 and accepts, receives, obtains or otherwise accesses suggestion data 1762 and network location data 1772 from the navigation service 1780. A user 1705 may input characters into an agent 1710 by, for example, typing such characters into a field, clicking on a link that provides such characters, or providing audio input. Regarding audio input, raw audio data can be converted using known techniques into character strings usable by embodiments by any of a variety of instrumentalities, such as agent 1710, navigation service 1780, or a separate computer communicatively coupled to agent 1710 and/or navigation service 1780. Further regarding audio input, a trigger work can be employed such that when the user 1705 utters the trigger word, an audio interface activates. The trigger word can be, for example, "at" or another name space prefix. The agent 1710 also generally outputs, transmits, opens or otherwise provides access related to suggestion data 1762 and network location data 1772 for the user 1705 and generally outputs, transmits, opens or otherwise provides access related to navigation data 1751 and suggestion choice data 1771 for the navigation service 1780. Various embodiments of the agent 1710 may perform other functions as well. In various embodiments, the agent 1710 may be implemented in software, firmware, hardware, or any combination thereof. In some exemplary embodiments, the agent 1710 may be a browser, a standalone application, a plugin or add-on to another program (e.g., a browser plugin), or a service, (e.g., a web service), among other things. The agent can be present in a navigation application (e.g., a browser) in a mobile device such as a smart phone. The agent 1710 may be separate from a web browser, an interface or control within a web browser, or even a modification of a web browser's address bar. In some embodiments, the agent 1710 can be implemented on a client computer or in web browser as disclosed in Section I, above. More particularly, the agent 1710 can include some or all features, functions, communications, implementation details, code, algorithms, architecture, structure, and properties of the web browser disclosed in Section I, above.

In various embodiments, the navigation service 1780 may be anything that can interact with the agent 1710 and the user 1705 as described herein. The navigation service 1780 generally accepts, receives, obtains or otherwise accesses input data from the user 1705 and accepts, receives, obtains or otherwise accesses navigation data 1751 and suggestion choice data 1771 from the agent 1710. The navigation service 1780 also generally outputs, transmits, opens or otherwise provides access related to suggestion data 1762 and network location data 1772 for the agent 1710. In various embodiments, the navigation service 1780 may be implemented in software, firmware, hardware, or any combination thereof. In some exemplary embodiments, the navigation service 1780 may be a standalone application, a server application, a plugin or add-on to another program (e.g., a browser plugin), or a service, (e.g., a web service), among other things. In some embodiments, the navigation service 1780 and the agent 1710 may be implemented on separate computing systems and may communicate via a network(s) (not shown), such as the internet or a combination of the internet and a cellular telephone network. In other embodiments, the navigation service 1780 and the agent 1710 may be implemented on the same computing system, either as separate programs or in the same program. In some embodiments, the navigation service 1780 can be implemented in or as a URL keyword resolution server described in Section I, above. More particularly, the navigation service 1780 can include some or all features, functions, communications, implementation details, code, algorithms, architecture, structure, and properties of the URL keyword resolution server disclosed in Section I.

As shown in the example of FIG. 17, system 1700 also includes entity representations 1720, which are consulted, accessed, and otherwise utilized by the navigation service 1780 and the agent 1710. In some embodiments, the entity representations 1720 can be implemented as stored keyword mappings and/or the contents of a keyword registry database as disclosed in Section I, above. More particularly, the entity representations 1720 can include some or all features, functions, communications, implementation details, code, algorithms, architecture, structure, and properties of the stored keyword mappings and/or contents of the keyword registry database disclosed in Section I.

In various embodiments, an entity is something that controls, or has the right to control, or has some other interest in, a network resource(s), including, for example, a domain or name space. From the use-case example above, Gimbels is an entity because it owns the (perhaps trademarked) brand "Gimbels" and because it is the registrant for the domain ".gimbels" and so has the right to control domains ending in ".gimbels" which specify network resources, such as Gimbels web pages. An entity can be a content provider and/or domain name controller as described in Section I, above. In some embodiments, an entity can be a name owner, or a delegate of a name owner, where the term "name owner" generally refers to the user or entity with whom a name is primarily associated, and who has registered the name in a given name space. Depending on intellectual property arrangements, a "name owner" may not actually have legal ownership rights to the name, but is still the party with primary interest in promoting the use of the name to identify associated information and services. In some embodiments, generic entity names such as "zoo" are associated with particular entities via various techniques, such as, for example, name auctions. That is, generic names sometimes may have an associated entity.

In some embodiments, the entity representations 1720 can be stored in one or more databases (e.g., one or more directories). Such database(s) can include in a first column entity names, e.g., from a third-party name space. Thus, first-column entries for the entity name "gimbels" can include, for example, "@gimbels" (corresponding to a TWITTER name space), "fb:gimbels" (corresponding to a FACEBOOK name space), and ".gimbels" (corresponding to a DNS name space). These entries can be included in the same entity representation database, separate entity representation databases, or separate tables within one or more databases. In embodiments that utilize separate databases or tables for each name space, the name space identifier may be omitted from the stored entity name, with each database or table instead being identified with a particular name space.

In various embodiments, the entity (e.g., the name owner) may provision, direct, setup, instruct, or otherwise specify to the navigation service 1780 the suggestion data 1762 to generate or return for navigation data 1751 having certain characteristics, such as having entity identification (ID) data 1752 (e.g., an entity name) that matches with, maps to, or otherwise corresponds with the entity. In some embodiments, the entity's specifications or instructions in this regard may be stored or otherwise represented in the entity representations 1720 and/or affect the functioning of the mapping 1782, the mapping 1784, and/or the lookup 1787. In some embodiments, an entity may manipulate the entity representations 1720 and/or the functioning of the mapping 1782, the mapping 1784, and/or the lookup 1787 during operation of the navigation service 1780, such that the suggestion data 1762 and/or the network location data 1772 vary frequently. In other embodiments, something other than the entity may direct, setup, instruct, or otherwise specify to the navigation service 1780 the suggestion data 1762 to generate or return according to the characteristics of the navigation data 1751. In some embodiments, the suggestion data 1762 includes or consists of one or more keywords. Note that a "keyword" can be a concatenated plurality of separate words, e.g., "shoesonsale".

In the exemplary depiction of FIG. 17, each row 1731-1734 of the entity representations 1720 contains data representing or associated with a different entity. As shown, there can be any number "n" of entities represented. As shown, the first (leftmost) column of each row includes an identifier for the entity—in this example, row 1731 starts with the entity identifier "Entity 1"; row 1732 starts with the entity identifier "Entity 2"; etc. In some embodiments, the entity identifiers are names from a name space. The next two columns of each row contain any number "m" of suggestions and network locators that are associated with the entity identified in the first column. Thus in this example there is a one-to-many relationship (e.g., 1 to m) between each entity and its associated suggestions and network locators.

Items 1735-1737 of FIG. 1 show an expansion or additional details of the last two columns of row 1734 for "Entity n" 123. Items 1735-1737 indicate that there are "m" network locators, and therefore up to "m" network resources, represented for Entity n. As shown, each of items 1735-1737 includes one or more suggestions (which may be keywords) in the left-hand column associated with each network locator in the right-hand column. For example, item 1735 for Entity n 1723 includes one or more "Suggestion(s)" 1724 for "Network Locator 1" 1725. Thus in this example there is a (one-or-more)-to-one relationship (e.g., >=1 to 1) between suggestions and their associated network locators.

In various embodiments, a network locator (e.g. "Network Locator 1" 1725) is data sufficient to allow the agent 1710 and/or the user 1705 to locate a network resource and/or information sufficient to allow the agent 1710 and/or the user 1705 to access the network resource. Examples of a network locator include a URL, a URI, an URN, an IP address, and a DNS A record, among other things. In various embodiments, a suggestion (e.g., "Suggestion(s)" 1724) is data or code that suggests or otherwise describes the network resource that is accessible using the network locator with which the suggestion is associated. In some embodiments, a suggestion includes, or enables the presentation of, words, images, video, etc. that cause a human (e.g., the user 1705) to be led to, think of, consider, or otherwise be reminded of the corresponding network resource. The suggestions may include applications, including applications that are run by the navigation service 1780 to produce suggestion data 1762 and/or applications that are sent in suggestion data 1762 to be run by the agent 1710. In some embodiments, the suggestion data 1762 includes or consists of one or more keywords. One example of a suggestion are the characters "gimbels.shoes" in association with a network locator that points to a Gimbels retail web page for purchasing shoes (e.g. the network locator "http://www1.gimbels.com/shop/clothing/shoes"). Another example of a suggestion, in this case a keyword, are the characters "shoes" in association with an entity name of "Gimbels" and a network locator that points to a Gimbels retail web page for purchasing shoes.

The term "provisioning" as used herein refers to the collection of management services by which an entity (e.g., a name owner) creates, updates, and deletes entity representation entries and otherwise maintains information about name and keyword combinations. A provisioning interface may be implemented using a web interface, for example.

In some embodiments, prior to permitting a name owner to provision its associated entity representation data, the name owner may be required to authenticate itself, and there are many possible techniques for doing so. In some implementations, the name owner demonstrates that it is indeed associated with the entity name in question. This may be accomplished when first establishing authentication credentials, e.g., when the name owner signs up for an account with the navigation service. For example, if the name space consists of email addresses, a confirmation message may be sent to the specified email address. Proof of successful receipt of that confirmation message (e.g., by return email or by receiving particular data at a URL in the email message) may demonstrate ownership of the email address. As another example, if the name space is from one of the social networks (e.g., FACEBOOK), it may be possible for the name owner to log in to the navigation service using credentials from that social network, which may demonstrate ownership of the corresponding name. Mechanisms for demonstrating ownership of domain names are known in the art of domain name management and may be used for provisioning operations as discussed herein.

Provisioning in the TWITTER name space may be accomplished using existing TWITTER authentication techniques. That is, TWITTER itself authenticates TWITTER users when they post messages to its service, so tweets automatically carry proof of ownership of the associated name. Thus, a direct tweet to the provisioning operation of the navigation service may be accepted as an authentic request to update information in the navigation service's entity representations. For example, a tweet or Twitter "direct message" from "@example_brand" to "@provisioning_operation" of the form "update #news <URL>" may be used to update the network locator associated with "@example_brand#news" to "<URL>". Continuing this example, and for some embodiments, no web interface or email is required, rather, just a tweet directly to the provisioning operation. The "tweet" channel to the provisioning operation may also support a broader command set, including setting new entity names, keywords and network locators.

Provisioning in social networks such as FACEBOOK and LINKEDIN may be accomplished by "sharing" content with certain keywords, via special-purpose applications within the respective environments.

In various embodiments, the entity representations 1720 may be implemented in any number of ways, including directories, databases, data structures, lookup tables, arrays, records, straight line code, etc., as are known in the computer science art. Also, in various embodiments, the entity representations 1720 may be implemented as part of the navigation service 1780, as a separate service, in a separate database system, or in various other ways as are known in the computer science art. The exact implementations are not important to the invention.

In operation, the embodiment of the system 1700 shown in FIG. 1 may function in the manner described below with respect to a shoe shopping use-case example. In this example, the user 1705 is a human who desires to connect to and interact with a web page for the retailer Gimbels to purchase shoes. To do this, the user 1705 provides input navigation data 1751 (also referred to as a "command string") to the agent 1710, which data 1751 generally describes what is desired. The user 1705 can be a human or a programmed computer, and the command string 1751 can be obtained by typing into a field, clicking on a link, or speaking into a microphone. The agent 1710 may have a network locator for the navigation service hard coded into its software. In some embodiments, the user 1705 may type in a character string as input navigation data 1751 to the agent 1710. In a particular example, the user 1705 may type "gimbels shoes", "@gimbels!shoes", "gimbels.shoes", or ".gimbels!shoes" into the navigation bar or omnibar of a browser that includes the agent 1710. The agent 1710 may provide the navigation data 1751 to the navigation service 1780. Thus, the agent 1710 may process the syntax of the navigation data 1751 in order to derive a request message, which is to the navigation service.

In some embodiments, the agent 1710 may provide the navigation data 1751 sequentially as it is entered (e.g., one character at a time). In other embodiments, the agent 1710 may provide the navigation data 1751 in parts, sections, or other portions, perhaps as distinguished or separated by specified name space identifiers, delimiters, trigger characters, symbols, or the like (e.g., period "."; slash "/"; colon ":"; space " "; "@"; "!"; "|"; "fb:"; "in:"; etc. may distinguish one portion from another). For example, in such embodiments, the input data "gimbels.shoes" may be provided in two parts "gimbels." and "shoes" based on recognizing the "." as a delimiter or trigger character. In other embodiments, the command string "@gimbels!shoes" may be provided to the navigation service 1780 in two parts, as "gimbels" and "shoes", along with an indication of the associated name space (identified as TWITTER here by the "@" symbol). In other embodiments, the command string "@gimbels!shoes" may be provided to the navigation service 1780 one character at a time, which the navigation service 1780 accumulates to form a final command string. In such embodiments, the delimiting characters may or may not be conveyed. In yet further embodiments, the command string "@gimbels!shoes" may be provided to the navigation service 1780 in successively more complete parts in multiple iterations of command strings, with the final version being the full command string, e.g., first "@", then "@g", then "@gi", then "@gim", then "@gimb", etc. In yet other embodiments, the agent 1710 may provide the navigation data 1751 only in its entirety to the navigation service 1780.

In some embodiments, the agent 1710 may handle the syntax of the command string by deriving a query string derived from the entered command string and sending it to the navigation service as a request. In such embodiments, the navigation data 1751 "@example_brand#news" is, for example, converted to "example_navigation_service.com/lookup?name=%40example_brand&keyword=news" for transmission to the navigation service. (Here, the query string is the part starting with "?name". The notation "%40" represents the "@" symbol, which is not allowed in this part of a traditional URL.) An advantage of such embodiments is that syntax can continue to evolve, and that resolution depends only on the availability of a navigation service 1780, of which there could be more than one.

In some embodiments, the agent 1710 maps the navigation data 1751 directly to a traditional URL with a particular format. For example, the command string "@example_brand#news" may be converted to "twitter-navigator.net/example_brand/news" for transmission as a request to the navigation service 1780, or for resolution using traditional DNS (not shown in FIG. 17). The navigation service for such embodiments could be implemented as the collection of web services corresponding to the different syntaxes, e.g., one for TWITTER names, one for FACEBOOK names, etc.

In some embodiments, the agent 1710 determines, based on syntax, whether entered navigation data 1751 is a traditional URL, in which case the agent 1751 may process it using the traditional DNS system, or a smart navigation command string, in which case the agent 1719 may process it as disclosed herein.

Other embodiments regarding command string syntax handling are possible, including combination of the above exemplary embodiments, depending on the type and format of the navigation data 1751.

For embodiments in which the agent 1710 provides an initial portion of the command string to the navigation service before the user has completed entry of the full command string, the agent 1710 can display suggestions for entity names consistent with the already-entered portion of the full entity name. That is, the agent 1710 can convey an initial segment of the entity name to the navigation service 1780 as the entity name is being entered by the user. The navigation service 1780 can provide a list of entity names that begin with the same (and/or similar) initial segments of characters to the agent 1710 based on matching the initial segment to the contents of the entity representations 1720. The agent can receive the list and display or otherwise present all or some of the contents of the list to the user, such as in a menu, e.g., a drop-down menu. The user 1705 can select a full (or partially complete) entity name presented in the menu in a conventional manner, e.g., by clicking on it. In such embodiments, clicking on a presented entity name can automatically populate the entry field with the (full or partially complete) entity name as well as any associated name space identifier symbol. In some embodiments, once this takes place, the agent 1710 communicates with the navigation service 1780 to obtain and present to the user 1705 a list of keywords associated with the selected entity name. This option is discussed further below.

As an example of completing entity names via provided suggestion, consider providing a partial string, "@thenew" to the agent 1710. The agent, if configured to provide partial data to the navigation service 1780, can provide this partial data to the navigation service 1780. The navigation service can match the partial string "@thenew" to more than one entity name, e.g., "@thenewyorktimes" and "@thenewyorkyankees". The navigation service 1780, in turn, can provide suggested completions of "@thenewyorktimes", "@thenewyorkyankees" and "@thenewyork" to the agent 1710. Note that the first two suggestions are of actual entity names stored by the navigation service 1780, whereas the third suggestion is a suggested partial completion, which can be completed in more than one way to arrive at a stored entity name. Agent 1710 can present the three suggested completions to a user 1705, for example, in a pop-up menu. If, on the one hand, the user selects either of the first two suggestions, the process can, for example, present to the user 1705 a list of keywords associated with the selected entity name, discussed further herein. If, on the other hand, the user selects the third suggested completion, the agent 1710 can communicate the selection to the navigation service 1780, which can determine that it can be completed by either of "@thenewyorktimes" or "@thenewyorkyankees". The navigation service 1780 can respond by providing these suggestions to the agent 1710, which can present them to the user 1705, e.g., in a pop-up menu. At that point, the user 1705 can select either suggestion, and the process can continue by, for example, the agent 1710 obtaining from the navigation service 1780 and providing to the user 1705 suggested completions for a keyword. As discussed in this paragraph, the process of providing entity name suggestions can be interactive in embodiments that provide partial data from the agent 1710 to the navigation service 1780, in that it can involve multiple interactions before the final entity name is selected by the user 1705.

Regarding providing entity name suggestions in response to provided entity names, note embodiments are not limited to strict initial segment completion. Thus, for example, if a user were to provide the partial string "@gimb" to the agent 1710, in some embodiments, the agent 1710 and navigation service 1780 can interact and provide to the user 1705 the suggested completions of "@gimbels" and "@bimbals" (assuming that "@bimbals" is a provisioned entity name with the navigation service 1780). Various known techniques can be used to perform this matching, e.g., limited edit distance detection, etc.

In some embodiments, the agent 1710 provides an indication that an entered (or selected) entity name or entity identification has associated keywords and/or suggestions. That is, as a user enters a command string, the agent 1710 can alert the user upon entry of an entity name that is included in entity representations 1720. These embodiments are particularly suitable for implementations in which the agent 1710 provides the navigation data 1751 to the navigation service 1780 in parts, sections, or other portions, e.g., providing the entity identification upon entry of a keyword delimiter. Example indications include changing the color of the entry field of the agent 1710 (e.g., changing the background color of a browser omnibar from white to green), issuing an audible alert (e.g., a "beep"), and providing a list of keywords that are present in the entity representation 1720 associated with the entered entity name. This latter variation can be in the form of presenting a preview page to the user, where the preview page presents entity names together with the associated provisioned keywords. Upon receiving the navigation data 1751, the navigation service 1780 may process the data to classify, split, parse, or otherwise separate the navigation data 1751 into entity ID data 1752 and supplemental data 1753. In some embodiments, the supplemental data 1753 can be one or more keywords, e.g., prepended with a keyword delimiter character or symbol, such as "!". In such embodiments, some or all of the suggestions 1724-1728 may be keywords. In some embodiments, the navigation data 1751 may be separated by the agent 1710 before it is received by the navigation service 1780. In various embodiments, the entity ID data 1752 is data sufficient to allow the navigation service 1780 to attempt to identify or map to 1782 or otherwise determine at least one corresponding entity of the entity representations 1720, such as "Entity n" 1723 as represented by arrow 1783 in FIG. 17.

Considering this functionality in the context of continuing the previous use-case example, the navigation service 1780 may map 1782 the entity ID data 1752 "gimbels." to an identifier ".gimbels" in the first column of entity representations 1720. In this example, the identifier ".gimbels" in the entity representations 1720 is a top level domain controlled by the registrant retailer Gimbels, and the navigation service 1720 maps "gimbels." to it because of the exact character string match "gimbels" to "gimbels", ignoring the trigger character ".". As another example, for the command string "@gimbels!shoes" from the navigation data 1751, the navigation service 1780 may map the entity name "@gimbels" to the identifier "@gimbels" in the first column of entity representations 1720, accounting for the name space identifier "@". Various implementations may use various other known-in-the-art techniques and algorithms for mapping entity ID data 1752 to an entity identifier 1723 or otherwise identifying one or more entity identifier 1723 that corresponds to the entity ID data 1752 in the entity representations 1720, in addition to or in place of exact character matching. In addition, various implementations may include mapping that is restricted according to context or the identity of the user 1705, for example, in the case of a user 1705 that is utilizing the agent 1710 in the context of a mobile device, the navigation service may restrict the mapping 1782 and/or 1784 to name spaces (e.g., entity identifiers 1723) and/or to suggestions (e.g., keywords) 1724 and network locators 1725 that are appropriate for mobile devices (e.g., a network locator 1725 that corresponds to the mobile device version of the Gimbels retail web page for purchasing shoes). The exact mapping implementation is not critical to the invention.

Having mapped the entity ID data 1752 to the entity identifier "Entity n" 1723, the navigation service 1780 may next map 1784 the supplemental data 1753 to one or more suggestions that are associated with the entity identifier "Entity n" 1723. In various embodiments, the supplemental data 1753 is data sufficient to allow the navigation service 1780 to attempt to identify or map to 1784 or otherwise determine at least one suggestion associated with Entity n 1723 that corresponds to the supplemental data 1753 (e.g., a keyword). In the example shown, the navigation service 1780 maps the supplemental data 1753 to suggestions 1724 and 1728 (e.g., keywords), as represented by arrows 1785 and 1786. As another example, for the entered command string "@gimbels!shoes", the navigation service may use the keyword "shoes" as the supplemental data 1753; in this example, the keyword "shoes" may map 1784 to the suggestion 1724 or 1728 "shoes" stored in the entity representation 1720, because the keyword string "shoes" and the suggestion string "shoes" exactly match each other.

Considering this functionality in the context of continuing the previous use-case example, the navigation service 1780 may map 1784 the supplemental data 1753 "shoes" to a suggestion 1724 "gimbels.shoes" associated with the entity identifier ".gimbels" and may also map the supplemental data 1753 "shoes" to a suggestion 1728 "gimbels.shoes-on-sale" associated with the entity identifier ".gimbels" in entity representations 1720. In some embodiments, the navigation service 1780 maps 1784 the supplemental data 1753 in the form of one or more keywords to a suggestion in the form of one or more keywords that are associated with the already-entered entity name 1723 in the entity representations 1720. Various implementations may use various other known-in-the-art techniques and algorithms for mapping 1784 in addition to or in place of partial character matching, which may include mapping that is restricted according to context or the identity of the user 1705. The exact mapping implementation is not critical to the invention.

As shown in the example of FIG. 17, the navigation service 1780 sends the mapped-to suggestions 1724 and the mapped-to suggestions 1728 to the agent 1710 as suggestion data 1762. In various embodiments, suggestion data 1762 is data that represents the mapped-to suggestions in the entity representations 1720 (e.g. suggestions 1724 and suggestions 1728) and that can be presented, digitally, visually, audibly or otherwise, to the user 1705. As noted previously, in some embodiments the suggestion data 1762 may include executable code or the like that can be run by the agent 1710. In some embodiments, the suggestion data 1762 may be customized for presentation by the device hosting the user agent 1710. Continuing the previous use-case example, the navigation service 1780 may transmit suggestion data 1762 that includes the string "gimbels.shoes" and the string "gimbels.shoes-on-sale". (Note that strict fragment completion is only one way of suggesting completions for keywords. Other ways of determining partial matches can also be used. For example, if a user provides "@gimbels!skoes" to an agent 1710, embodiments can match the partial string "!skoes" to "!shoes" using known heuristic matching techniques (e.g., limited edit distance).

Upon receiving the suggestion data 1762, the agent 1710 may present the suggestion data to the user 1705 and enable the user 1705 to choose at least one of the suggestions (1714). Continuing the use-case example, a browser implementing the agent 1710 may display the suggestion data 1762 "gimbels.shoes" and "gimbels.shoes-on-sale" in a selectable list or drop down menu that allows the user 1705 to choose one of the suggestions using a touchscreen or mouse, as represented by input data 1726. The process can thus be interactive, as with the process of providing suggested completions for partial entity names. As is known in the user interface art, an example of one of the many ways a user may select or choose an item in a selectable list or drop down menu is by positioning a mouse pointer over the desired menu item and clicking the left mouse button to create input data 1726. There are many other ways and techniques known in the computer science art for presenting various data choices and allowing a user to choose or select one or more that may be used to implement 1714, and the exact implementation is not important to the invention.

In some embodiments, upon entry of a recognized entity name or entity identification or other name space identification, the agent 1710 can provide some or all of the list of keyword suggestions that are present in the entity representation 1720 associated with the entered entity name by providing them to the user in a menu, e.g., a drop-down menu. The user 1705 can select a keyword presented in the menu in a conventional manner, e.g., by clicking on it. In such embodiments, selecting the presented keyword can automatically populate the entry field with the keyword as well as any associated delimiting character, as well as convey the entered entity name and selected keyword to the navigation service 1780 as a request (e.g., navigation data 1751). As a specific example, a user can enter "@gimbels" into an input field of the agent 1710, and the agent 1710 can convey this information to the navigation service 1780. The navigation service 1780 can respond with a list of associated suggestions (keywords), which the agent 1710 can display to the user in a drop-down menu (e.g., containing "shoes", "men's clothes", "women's clothes", etc.) from which the user can select. Thus, the user is presented with a plurality of suggested keywords corresponding to the entered entity name. Further, upon receiving the list from the navigation service 1780, thus confirming the existence of an entry for that entity name, the agent 1710 can provide an indication that the entity name is recognized by, e.g., changing the color of the input field from grey to blue.

Based on the user's input 1726 indicating a choice of the presented suggestions, the agent 1710 sends suggestion choice data 1771 to the navigation service 1780. In various embodiments, the suggestion choice data 1771 corresponds to one of the suggestions previously sent to the agent 1710 in the suggestion data 1762. In the example of FIG. 17, the navigation service 1780 uses the suggestion choice data 1771 to look up 1787 or otherwise find the corresponding suggestion(s) 1728 in the entity representations 1720, as represented by arrow 1788. The navigation service 1780 may then identify the network locator corresponding to the looked-up suggestion—in the FIG. 17 example, "Network Locator m" 1729 corresponds to suggestions 1728 because it is stored in the same row—and return the network locator to the agent 1710 in the network location data 1772.

In some embodiments, the navigation service 1780 provides the network locators to the agent 1710 at the same time that it provides the suggestions (e.g., as part of the suggestion data 1762). In such embodiments, the agent 1710 need not engage in additional communications (e.g., sending suggestion choice data 1771 and receiving network location data 1772) with the navigation client 1780 in order to obtain the network locator corresponding to the suggestion chosen by the user. However, in some such embodiments, the agent 1710 can send data to the navigation service 1780 indicating which network locator the user selected.

As stated above, some embodiments can use a mapping that is restricted according to context or the identity of the user 1705. Thus, the agent 1710 can utilize 1727 context data, such as network location data 1716, by providing 1772 it to the navigation service 1780. This can be done automatically, without requiring user input. The navigation service 1780 can use the network location data 1716 to look up 1787 or otherwise determine the network locator 1737 that not only corresponds to the matched suggestion(s) 1728 in the entity representations 1720, but also lies topologically near to the agent 1710 based on the context data. Some embodiments may accomplish this by storing multiple rows that include the same suggestions 1728 paired with different network locators corresponding to different geographic or network locations. Note that in alternate embodiments, the navigation service 1780 provides to the agent 1710 multiple network locators together with information reflecting their geographical or network locations. In such embodiments, the agent 1710 can use the context information to select the network locator that is topologically or geographically closest.

In some embodiments, the context data can be supplied by the agent 1710 along with the initial navigation data. For example, the navigation service 1780 might receive a string for a generic entity name, such as "@zoo", along with geographical information as part of the navigation data 1751. The navigation service 1780 might match this entity ID to multiple entities 1723, and select the one that is closest to the provided geographical data. In alternate embodiments, the navigation service 1780 provides multiple network locators to the agent 1710, and the agent 1710 selects the closest network locator based on its context data.

Note that network location data 1716 is but one type of context data usable with embodiments. Other types of context data can include, without limitation, language type, authentication information, IP address, reputation data, user-name/password, encryption schemes, hardware keys, geo-location information, fingerprint identification, encrypted packages using private/public key authentication schemes, machine hardware IDs, product or license IDs, security policy certificates, or any other imaginable user-identifying or machine-identifying information. These and further examples are discussed in detail in U.S. patent application Ser. No. 13/828,070 entitled "Adaptive Name Resolution" and filed Mar. 14, 2013, the contents of which are hereby incorporated by reference herein in its entirety.

Continuing the Gimbels use-case example, if the user 1705 chose "gimbels.shoes" from the drop down menu, then the navigation service 1780 may look up 1787 the suggestion "gimbels.shoes" in the entity representations 1720 and find "http://www1.gimbels.com/shop/clothing/shoes" as the corresponding network locator. The navigation service 1780 may then send the string "http://www1.gimbels.com/shop/clothing/shoes" in the network location data 1772.

As shown in FIG. 17, the agent 1710 may utilize the network location data 1772 for various purposes. In various embodiments, the agent 1710 may utilize the network location data 1772 to navigate to, directly connect to, interact with, or otherwise access a network resource addressed or identified by the network location data 1772. In some embodiments where the network locators 1725-1729 are sent with the suggestions 1724-1728 in the suggestion data 1762, the agent 1710 automatically navigates to, directly connects to, interacts with, or otherwise interacts with the network resource addressed or identified by the network locator upon the user selecting the corresponding suggestion, such as a keyword.

Continuing the Gimbels use-case example, the agent 1710 may extract the string "http://www1.gimbels.com/shop/clothing/shoes" from the network location data 1772 and input it into a browser. The browser may resolve the string as it would any other URL and render the corresponding Gimbels web page for the user 1705 to purchase shoes. For example, the browser can contact a domain name server to obtain an internet protocol address corresponding to the network location data, and then navigate to that internet protocol address.

To conclude the Gimbels use-case example, the agent 1710, e.g., a browser, can optionally display the entity name and suggestion (e.g., keyword) combination. Such display can be in a navigation bar or omnibar. In some embodiments, the agent can display a network locator 1725-1729 or the network location data 1772, e.g., a URL, in the navigation bar or omnibar of a browser. In some embodiments, the agent 1710 can toggle between displaying, on the one hand, the entity name and suggestion (e.g., keyword) combination, and, on the other hand, the network locator or network location data, e.g., a URL. Such toggling can be initiated by user input, e.g., the user 1705 activating a dedicated soft button. Some embodiments display both the entity name and suggestion (e.g., keyword) combination and the network locator or network location data.

In general, some embodiments may employ redirection. In such embodiments, once the user 1705 selects or otherwise enters into an agent 1710 a command string that includes entity ID data 1752 (e.g., an entity name, which may include a name space identifier) and supplemental data 1753 (e.g., a keyword), and the agent 1710 conveys a corresponding request to the navigation service 1780, the navigation service 1780 can perform a redirection that utilizes the same special format. The redirection can be based on the entity name owner's (e.g., name space owner) provisioned preferences. The preferences can reflect time-sensitive or other special concerns. For example, the user might enter "@gimbels!shoes" into a navigation bar of a browser equipped with an agent 1710. The agent 1710 conveys a corresponding request (e.g., via navigation data 1751) to the navigation service 1780. The navigation service 1780 can match or otherwise map the data of the request to different data corresponding to a different command string, e.g., "@gimbels!shoes_on_sale_January_2014". Such mappings can be specified by the name owner itself and be invisible to the user. The navigation service 1780 can then provide the appropriate corresponding data (e.g., a network locator 1725-1729) to the agent 1710. This data can be provided together with data reflecting the original command string (here, "@gimbels!shoes"), so that the redirection is invisible to the user, or with data reflecting the new command string (here, "@gimbels!shoes_on_sale_January_2014").

Some embodiments perform error handling in various ways. That is, the navigation service can respond to requests (e.g., navigation data 1751) that include entity names (e.g., entity ID data 1752) and/or keywords (e.g., supplemental data 1753) that are not in the entity representations 1720 in various ways. If the navigation service 1780 receives a request that includes an entity name present in the entity representations 1720 of the navigation service 1780, but the name and keyword combination is not present, then the navigation service 1780 could: return a network locator for an error page, return a network locator for a related combination of name and keyword, auto-correct to a related combination of name and keyword, redirect to a related combination of name and keyword, or attempt to find content that might correspond to that keyword but has not yet been registered in the entity representations. The latter four each involve a heuristic determination of the name owner's (or user's) preferences, using known techniques. Error handling can also provide a way for a name owner to provision a large set of keywords. The name owner might specify to the navigation service 1780 that if it receives a request that includes a keyword with certain properties (e.g., SOUNDEX equivalent to a specified keyword, synonym to a specified keyword, etc.), then map it according to rules specified by the name owner.

If the navigation service 1780 receives a request that includes a name (e.g., entity ID data 1752) that does not exist in its entity representations 1720, but that exists in some name space, then, in addition to the options disclosed above, the navigation service 1780 could return a network locator for search results from the name space. For instance, if the user enters "@gimbels!shoes" and "@gimbels" exists in the TWITTER name space, but not in the navigation service's entity representations 1720, then the navigation service could provide a network locator for a page of tweets (i.e., TWITTER microblog entries) by "@gimbels" about "shoes". The page could also include an informational message offering the name owner the opportunity to register the keyword with the navigation service 1780. Similar result pages could be constructed for other name spaces as well.

If the navigation service 1780 receives a request that includes a name (e.g., entity ID data 1752) that exists neither in its entity representations 1720 nor in some other name space, then the navigation service 1780 could return a network locator for an error page or for a suggestion.

One of ordinary skill will recognize that the components and implementation details of system 1700 are simplified examples presented for conciseness and clarity of explanation. Other components, implementation details, and variations may be used. For example, either of suggestion data 1762 and network location data 1772 may include, where appropriate, an error code or other indication that the mapping or lookup has failed or that the direct navigation service 1780 cannot return the expected response. Many other variations are possible.

Figure 18:
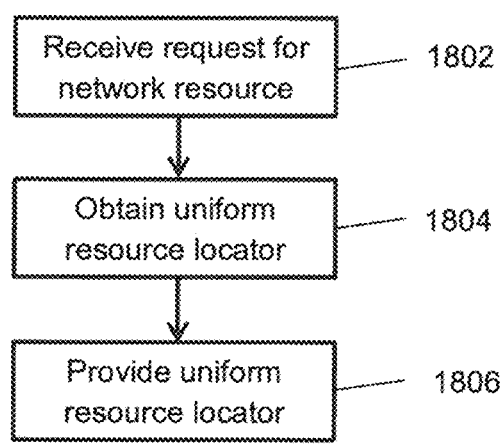
FIG. 18 is a flowchart illustrating a method from the perspective of a navigation service according to various embodiments.

FIG. 18 is a flowchart illustrating a method from the perspective of a navigation service according to various embodiments. The method of FIG. 18 can be implemented by a navigation service as disclosed herein. More particularly, the method of FIG. 18 can be performed by the navigation service 1780 of FIG. 17, or by a URL keyword resolution server described in Section I, above.

At block 1802 the navigation service receives a request for a network resource. In some embodiments, the request includes an entity name and a keyword. The request may include a name space identifier, or otherwise indicate a name space associated with the entity name. The request may be received from an agent, e.g., agent 1710 of FIG. 17, or from a client computer or from a web browser as disclosed in Section I, above. The agent may have derived the request from a command string entered by a user as discussed herein. The navigation service may obtain the request from an agent over a network such as the Internet. The navigation service may receive the request all at once, or in portions, as disclosed in Section II, above.

At block 1804, the navigation service obtains a uniform resource locator or other network locator (e.g., one or more of network locators 1725-1729) that corresponds to the request received at block 1802. In some embodiments, the navigation service obtains the uniform resource locator from one or more databases or directories, e.g., one or more databases containing entity representations, or from one or more databases stored in data repository 130 as disclosed in Section I, above. The navigation service can perform a matching between the entity name received at block 1802 and the entity names stored in the database(s), and between the keyword received at block 1802 and the keywords stored in association with the matched entity name. The matching of the entity name and/or the keyword can be an exact matching, or utilize heuristics or other fuzzy matching techniques. Once matched, the navigation service retrieves the corresponding uniform resource locator (or other network locator) from the database, e.g., from the same row as the matched entity name and keyword.

At block 1806, the navigation service provides the uniform resource locator (or other network locator) to the requestor, e.g., the agent. This can occur by the navigation service sending the uniform resource locator to the requestor over a network such as the internet. In some embodiments, the navigation service also provides one or both of suggested entity names and suggestions for supplemental data (e.g., keywords).

Figure 19:
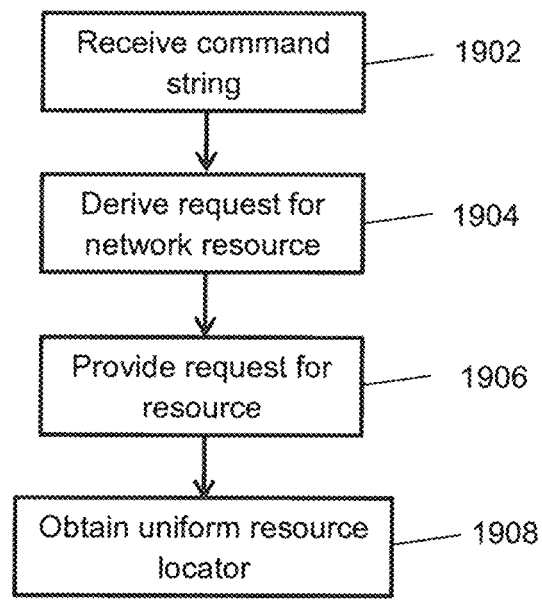
FIG. 19 is a flowchart illustrating a method from the perspective of an agent according to various embodiments.

FIG. 19 is a flowchart illustrating a method from the perspective of an agent according to various embodiments. The method of FIG. 19 can be implemented by an agent as disclosed herein. More particularly, the method of FIG. 19 can be performed by the agent 1710 of FIG. 17, or by a client computer or in a web browser as disclosed in Section I, above.

At block 1902, the agent receives a command string, e.g., upon a user clicking on a link, or as entered by a user into a field, such as a navigation bar or omnibar. The command string can include an entity name and a keyword. The command string can further include a name space identifier next to the entity name, and/or a keyword delimiter next to the keyword.

At block 1904, the agent derives a request for a network resource from the command string received at block 1902. The agent can derive the request by parsing the command string to extract the entity name and the keyword using known techniques. The request can include the entity name, the keyword, and possibly a name space identifier corresponding to the entity name.

At block 1906, the agent provides the request for the network resource to a navigation service over a network such as the internet. The navigation service can be, e.g., the navigation service 1780 of FIG. 17, or the URL keyword resolution server described in Section I, above. To convey the request, the agent may direct it to a uniform resource locator or other network locator coded into the agent's software.

At block 1908, the agent obtains a uniform resource locator or other network locator corresponding to the request provided at block 1906. The agent can obtain the uniform resource locator from the navigation service, which itself obtains it from one or more databases by finding a match to the entity name and keyword as disclosed herein. Once the agent obtains the uniform resource locator, it can take actions such as navigating to the resource identified by the uniform resource locator, for example.

There are many variations possible with the embodiments disclosed herein. For example, the navigation service is not limited to handling only entity name and keyword combinations. Rather, a navigation service can handle just an entity name, a combination or two or more entity names (e.g., forming a hierarchy), or a combination of two or more keywords (assuming appropriate ownership of at least one of the keywords), or some other combination. Considering keywords as a name space defined by a name owner, the navigation service can provide a way of provisioning and looking up information about a combination of one or more names, as specified by at least one name owner.

Another variation concerns how the navigation service 1780 is physically and logically implemented. In some embodiments, the navigation service 1780 may provide multiple instances (e.g., distributed servers) of the lookup operation to increase availability, balancing load across the instances. Some embodiments may utilize front-end service instances of the navigation service 1780 that interface with agents 1710, and back-end instances that hold the entity representation entries, similar in structure to DNS' concepts of recursive and authoritative name servers. The front-end instances may cache directory entries so that they can respond rapidly to requests. In addition, the agent 1710 itself may cache entity representation entries. Data integrity and data origin authentication mechanisms such as those in DNSSEC may also be applied. Similar implementation choices may apply to the suggestion and provisioning operations as well.

Another variation concerns how the agent 1710 handles rendering. In addition to displaying the result the user is looking for (as directed by the name owner), the agent 1710 can present additional guidance. Suggestions of names and keywords to enter are one possible form of feedback. The confirmation that the user has entered a recognized or registered name is another. A user interface associated with a browser-based agent 1710 may, as disclosed herein, highlight text or display of an icon; it may also play a sound, launch an application, and/or present initial results in a browser window or other interface. In particular, the interaction with the user is not limited to an "address bar" or equivalent. Just as the ultimate web page or other content may be rendered outside the interface where the user is directly entering navigation data, intermediate feedback may also be rendered in different programmatic locations.

Another variation concerns alternate alphabets. While this disclosure is written with respect to the standard English alphabet, the invention is not so limited. Embodiments can support other alphabets, including, without limitation, Mandarin (e.g., traditional, simplified), Japanese alphabets (e.g., kanji, hiragana, katakana), Korean, Hindi, Cyrillic, Tagalog, Tamil, Hungarian, Non-English Latin Alphabets (e.g., Portuguese, Spanish, French), Urdu, Greek, Hebrew, Armenian, Arabic, etc. Both entity names and keywords can be expressed in any, or even combinations, of various alphabets. For example, the following is a valid syntax for a command string: @医生杜明|décoratif, where "医生杜明" is an entity name in Chinese and "décoratif" is a keyword in French. Note that in this example, the entity name and keyword are in different alphabets.

In general, search engines crawl the web in order to retrieve and store search results. Search engines can be augmented to search the navigation service space to identify network locators that have been provisioned. Such search engines can specially identify search results that happen to correspond to provisioned network locators. For example, a search engine might receive a query that it matches to various links. The search engine may provide these links to a user by way of a results web page. Some of the links may be links provisioned in embodiments by an entity. In this example, the search engine can visually differentiate links provided by an entity from the other links, e.g., by presenting them in a different color, font, size, location, etc. As a concrete example that continues an ongoing example presented herein, a user might type "gimbels shoes" into a search engine's query field. The search engine might provide a results page that includes various links, such as a news article about Gimbels, a blog about shoes, and the link http://www1.gimbels.com/shop/clothing/shoes, which the Gimbels entity provided to an embodiment, i.e., as a network locator to be associated with a command string, e.g., @gimbels!shoes. In this way, the search space is extended to incorporate databases from the navigation service. In the results page, this latter link may be distinguished from the others as discussed herein.

In some implementations, the navigation service returns content rather than, or in addition to, network locators. In such implementations, the entity representations 1720 can include extra fields (e.g., one or more columns) storing the content in association with the entity name and keywords. The navigation service can then obtain content (once the user has selected the corresponding suggestion) by either directly retrieving content present in or liked from the appropriate entity representation, or by retrieving content by using the appropriate network locator stored in the entity representation. In either variation, the navigation service can return the content to the user itself, without the agent having to navigate to the associated network locator and retrieve the content.

In some implementations, the agent 1710 can utilize an image for all or part of the navigation data 1751. The image can be in any of a variety of formats, e.g., bitmap, GIF, JPEG, MPEG, etc. In such embodiments, the image can be used to generate entity ID data 1752, supplemental data 1753, or both, using any of a variety of instrumentalities. For example, the agent 1710 itself, the navigation service 1780, or a separate system can obtain the image, either from the agent 1710 or the navigation service 1780, and convert it to a character string using known techniques. The character string can then be provided to the navigation service, and the process can continue as disclosed herein.

As a concrete example, a user 1705 can obtain an image of a company logo, e.g., a Gimbels logo in JPEG format. The user can direct the agent 1710 to the logo using a graphical user interface, for example. The agent 1710 can provide the image to the navigation service 1780, which can use known image recognition techniques to match the image to the character string "gimbels". The navigation service can then process the string "gimbels" as if it had received the string directly, e.g., by matching it to a provisioned name space identifier and then providing a list of matched keyword suggestions data for the agent to display to the user.

Note that the use of images is not limited to entity identifications. For example, a user can type "@gimbels" into a field of agent 1710, and, when the agent displays a list of suggestions, the user can direct the agent to an image of a shoe. The agent 1710 can itself recognize the image using known techniques, or provide the image to the navigation service 1780 to perform the recognition function. Either way, the navigation service can respond as if it had received the string "@gimbels!shoes" directly.

Some embodiments utilize paired name space identifier characters and/or paired keyword delimiter characters, e.g., "[" paired with "]", "{" paired with "}", or "(" paired with ")". In such embodiments, examples of proper command string syntax can include, for example, {gimbels}(shoes), @gimbels(shoes), {gimbels}shoes, etc.

III. Computing System Implementation

Figure 20:
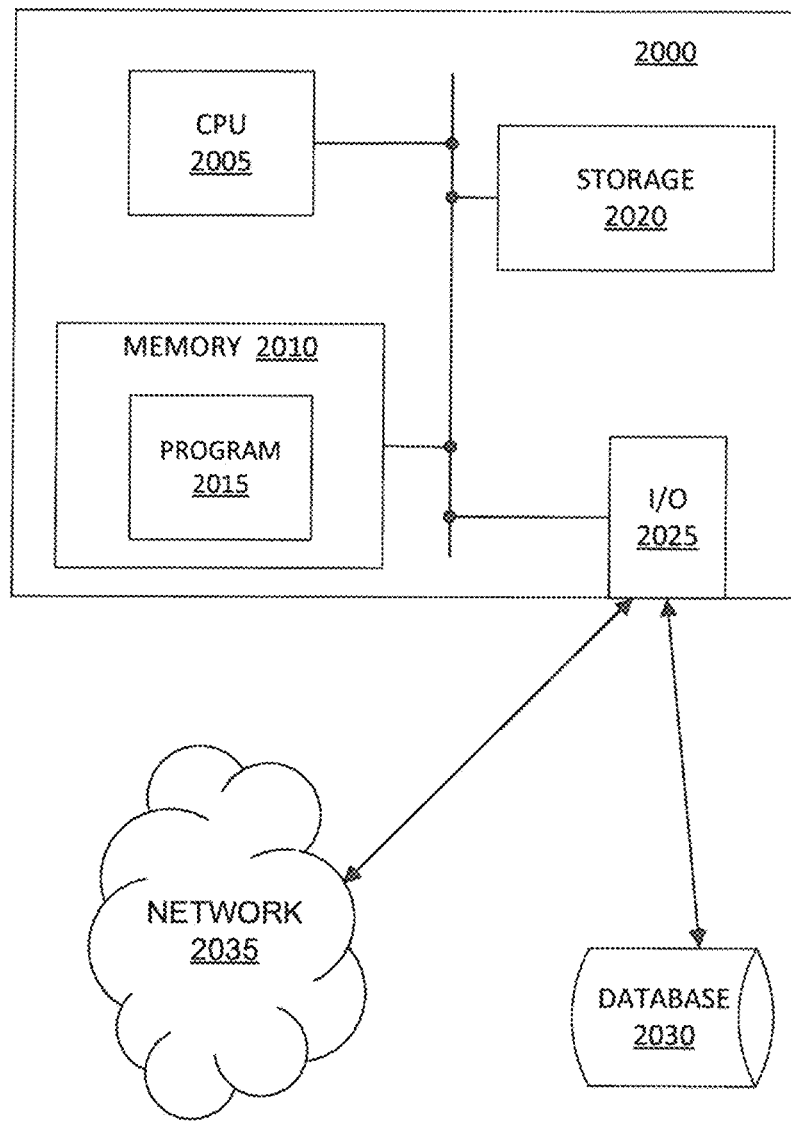
FIG. 20 shows an exemplary computing system that may be used to implement embodiments consistent with the invention.

FIG. 20 is a block diagram of an exemplary computing system or data processing system 2000 that may be used to implement embodiments consistent with the invention. Other components and/or arrangements may also be used. In some embodiments, computing system 2000 may be used to implement a navigation service 1780 as shown in FIG. 17, for example, either stand alone or as part of a larger navigation system. In various embodiments, computing system 2000 may be used to implement an agent 1710 as shown in FIG. 17.

Computing system 2000 includes a number of components, such as a central processing unit (CPU) 2005, a memory 2010, input/output (I/O) device(s) 2025, and a nonvolatile storage device 2020. System 2000 can be implemented in various ways. For example, an implementation as an integrated platform (such as a workstation, server, personal computer, tablet computer, laptop, smart phone, etc.) may comprise CPU 2005, memory 2010, nonvolatile storage 2020, and I/O devices 2025. In such a configuration, components 2005, 2010, 2020, and 2025 may connect and communicate through a local data bus and may access a database (implemented, for example, as a separate database system) via an external I/O connection. I/O component(s) 2025 may connect to external devices through a direct communication link (e.g., a hardwired or local wifi connection), through a network, such as a local area network (LAN) or a wide area network (WAN), and/or through other suitable connections. System 2000 may be standalone or it may be a subsystem of a larger system.

CPU 2005 may be one or more known processing devices, such as a microprocessor from the Xeon™ family manufactured by the Intel™ Corporation of Santa Clara, Calif., or the like. Memory 2010 may be one or more solid-state storage devices or mediums configured to store instructions and information executed or otherwise used by CPU 2005 to perform certain functions, methods, operations, and processes related to embodiments of the present invention. Storage 2020 may be a volatile or non-volatile, magnetic, semiconductor, tape, optical, or other type of storage device or computer-readable storage medium, including devices such as CDs and DVDs, meant for long-term storage.

In the illustrated embodiment, memory 2010 contains one or more programs or subprograms 2015, which may be loaded from storage 2020 or from a remote system (not shown), that, when executed by CPU 2005, perform various operations, procedures, functions, processes, or methods consistent with the present invention. Alternatively, CPU 2005 may execute one or more programs located remotely from system 2000. For example, system 2000 may access one or more remote programs via network 2035 that, when executed, perform functions and processes related to or implementing embodiments of the present invention.

In one embodiment, memory 2010 may include a program(s) 2015 that implements the communication, mapping, and look up functions described with respect to the navigation service 1780. In another embodiment, memory 2010 may include a program(s) 2015 that implements the communication, display, navigation, and connection functions described with respect to the navigation service 1780. In yet another embodiment, memory 2010 may include a program(s) 2015 that performs the receiving, obtaining, and providing functions described in reference to FIG. 18. In yet another embodiment, memory 2010 may include a program(s) 2015 that performs the receiving, deriving, providing, and obtaining functions described in reference to FIG. 19. In some embodiments, memory 2010 may also include other programs or applications that implement other methods and processes that provide ancillary functionality to the invention. For example, memory 2010 may include programs that interface with an entity owner or name space owner such that the owner can configure the entity representations 1720 for their entity IDs or name space.

Memory 2010 may be also be configured with other programs (not shown) unrelated to the invention and/or an operating system (not shown) that performs several functions well known in the art when executed by CPU 2005. By way of example, the operating system may be Microsoft Windows™, Unix™, Linux™, an Apple Computers™ operating system, or other operating system. The choice of operating system, and even to the use of an operating system, is not critical to the invention.

I/O device(s) 2025 may comprise one or more input/output devices that allow data to be received and/or transmitted by system 2000. For example, I/O device 2025 may include one or more input devices, such as a keyboard, touch screen, mouse, and the like, that enable data to be input from a user, such as a user 105. Further, I/O device 2025 may include one or more output devices, such as a display screen, CRT monitor, LCD monitor, plasma display, printer, speaker devices, and the like, that enable data to be output or presented to a user. I/O device 2025 may also include one or more digital and/or analog communication input/output devices that allow computing system 2000 to communicate, for example, digitally, with other machines and devices, for example, when computing system 2000 is acting as a web server. Other configurations and/or numbers of input and/or output devices may be incorporated in I/O device 2025.

In the embodiment shown, system 2000 is connected to a network 2035 (such as the internet, a cellular network, a private network, a virtual private network, or other network), which may in turn be connected to various systems and computing machines, such as a desktop computer, smart phone, tablet computer or laptop computer of a user 1705 that is equipped with an agent 1710 or a server computer that is implementing a navigation service 1780. In general, system 2000 may input data from external machines and devices and output data to external machines and devices via network 2035.

A database 2030 may also be used in conjunction with system 2000. In the embodiment shown, a standalone database external to system 2000 may be used. In other embodiments, a database may be hosted by system 2000. The database may be used to manage and store data used to implement systems and methods consistent with the invention. For example, the database 2030 may contain the entity representations 1720 of system 1700. In general, the database 2030 may store information that is accessed and/or managed through system 2000. By way of example, such a database may be an Oracle™ database, a Sybase™ database, or other relational database. Systems and methods consistent with the invention, however, are not limited to separate data structures or databases, or even to the use of a database or data structure.

It is to be understood that the foregoing description is exemplary and explanatory only and is not restrictive. In general, systems capable of performing the presented techniques may take many different forms. Further variations in configuration and implementation are possible. For example, resources described as singular can be plural, and resources described as integrated can be distributed. Further, resources described as multiple or distributed can be combined. The scope of the presented techniques is accordingly intended to be limited only by the following claims.

What is claimed is:

1. A method of providing a navigation service, implemented using a computer system, comprising:
receiving, at a navigation service and via the internet, a request for a network resource provided by a navigation client, the request derived from a formatted command string provided to the navigation client, the formatted command string consisting of an entity name portion and a keyword portion, wherein the entity name portion comprises an entity name and a name space identifier abutting the entity name, wherein the name space identifier is selected from the group consisting of: @, fb, in, and ".", wherein the keyword portion comprises a keyword and a keyword delimiter abutting the keyword, wherein the request comprises the entity name and the keyword, and wherein the navigation service is not a domain name system navigation service;
obtaining, from at least one database of the navigation service, a network locator corresponding to the entity name portion and the keyword portion, wherein the at least one database comprises data associating the entity name and the keyword with the network locator, the data provided to the navigation service by an entity corresponding to the entity name; and providing, in response to the receiving, to the navigation client, and via the internet, the network locator.

2. The method of claim 1, wherein the navigation client selects the navigation service based on a name space identifier.

3. The method of claim 1, wherein the keyword delimiter is selected from the group consisting of: #, !, ".", $, and |.

4. The method of claim 1, further comprising:
obtaining an internet protocol address corresponding to the network locator from a database of a domain name system service provider; and
providing the internet protocol address.

5. The method of claim 1, wherein the network locator comprises a uniform resource locator (URL).

6. The method of claim 1, whereby the navigation client obtains the network locator without sending a query to the Domain Name System (DNS).

7. A navigation service system comprising:
one or more navigation service server computers operably coupled to the internet and configured to receive, via the internet, a request for a network resource, the request provided by a navigation client, the request derived from a formatted command string provided to the navigation client, the formatted command string consisting of an entity name portion and a keyword portion, wherein the entity name portion comprises an entity name and a name space identifier abutting the entity name, wherein the keyword portion comprises a keyword and a keyword delimiter abutting the keyword, wherein the name space identifier is selected from the group consisting of: @, fb, in, and ".", wherein the request comprises the entity name and the keyword, and wherein the navigation service is not a domain name system navigation service;
at least one navigation service database operably coupled to the one or more servers, the at least one database storing a network locator in association with the entity name and the keyword, wherein the association is provided to the navigation service by an entity corresponding to the entity name; and
at least one electronic processor configured to provide the network locator to the navigation client via the internet.

8. The system of claim 7, wherein the keyword delimiter is selected from the group consisting of: #, !, ".", $, and |.

9. The system of claim 7, further comprising at least one processor configured to:
obtain an internet protocol address corresponding to the network locator from a database of a domain name system service provider; and
provide the internet protocol address.

10. The system of claim 7, wherein the network locator comprises a uniform resource locator (URL).

11. The system of claim 7, whereby the navigation client obtains the network locator without sending a query to the Domain Name System (DNS).

12. A method, implemented using a computer system, comprising:
receiving, by a navigation client, a formatted command string consisting of an entity name portion and a keyword portion, wherein the entity name portion comprises an entity name and a name space identifier abutting the entity name, wherein the name space identifier comprises a symbol selected from the group consisting of: @, fb, in, and ".", and wherein the keyword portion comprises a keyword and a keyword delimiter abutting the keyword;
deriving a request for a resource from the formatted command string, the request comprising the entity name and the keyword;
providing, to a navigation service comprising at least one database and at least one server computer communicatively coupled to the at least one database and via the internet, the request for the resource, wherein the at least one database comprises data associating the entity name and the keyword with a network locator, the data provided to the navigation service by an entity corresponding to the entity name, wherein the navigation service is not a domain name system navigation service; and
obtaining, from the navigation service and by the navigation client, a network locator corresponding to the entity name and the keyword.

13. The method of claim 12, further comprising selecting the navigation service based on a name space identifier.

14. The method of claim 12, wherein the keyword delimiter comprises a symbol selected from the group consisting of: #, !, ".", $, and |.

15. The method of claim 12, further comprising:
requesting an internet protocol address associated with the network locator;
receiving the internet protocol address associated with the network locator; and
navigating to the internet protocol address.

16. The method of claim 12, wherein the network locator comprises a uniform resource locator (URL).

17. The method of claim 12, wherein the navigation client obtains the network locator without sending a query to the Domain Name System (DNS).

18. A system comprising at least one processor configured to:
receive, by a navigation client, a formatted command string consisting of an entity name portion and a keyword portion, wherein the entity name portion comprises an entity name and a name space identifier abutting the entity name, wherein the name space identifier comprises a symbol selected from the group consisting of: @, fb, in, and ".", and wherein the keyword portion comprises a keyword and a keyword delimiter abutting the keyword;
derive a request for a resource from the formatted command string, the request comprising the entity name and the keyword;
provide, to a navigation service comprising at least one database and at least one server computer communicatively coupled to the at least one database and via the internet, the request for the resource, wherein the at least one database comprises data associating the entity name and the keyword with a network locator, the data provided to the navigation service by an entity corresponding to the entity name, wherein the navigation service is not a domain name system navigation service; and
obtain, from the navigation service and by the navigation client, a network locator corresponding to the entity name and the keyword.

19. The system of claim 18, wherein the at least one processor is further configured to select the navigation service based on a name space identifier.

20. The system of claim 18, wherein the keyword delimiter comprises a symbol selected from the group consisting of: #, !, ".", $, and |.

21. The system of claim 18, wherein the network locator comprises a uniform resource locator (URL).

22. The system of claim 18, wherein the navigation client obtains the network locator without sending a query to the Domain Name System (DNS).

* * * * *